(12) United States Patent
Settsu et al.

(10) Patent No.: US 6,374,353 B1
(45) Date of Patent: Apr. 16, 2002

(54) INFORMATION PROCESSING APPARATUS METHOD OF BOOTING INFORMATION PROCESSING APPARATUS AT A HIGH SPEED

(75) Inventors: Atsushi Settsu; Noriyuki Baba; Naoto Sugai, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/261,255

(22) Filed: Mar. 3, 1999

(30) Foreign Application Priority Data

Mar. 16, 1998 (JP) .................................... 10-065957

(51) Int. Cl.[7] .............................................. G06F 9/445
(52) U.S. Cl. ......................................................... 713/2
(58) Field of Search ............................................. 713/2

(56) References Cited

U.S. PATENT DOCUMENTS

| | | | |
|---|---|---|---|
| 5,307,497 A | | 4/1994 | Feigenbaum et al. |
| 5,355,498 A | | 10/1994 | Provino et al. |
| 5,918,048 A | * | 6/1999 | Mealey et al. .................. 713/2 |
| 5,933,631 A | * | 8/1999 | Mealey et al. .................. 713/2 |
| 6,052,778 A | * | 4/2000 | Hagy et al. ..................... 713/2 |

OTHER PUBLICATIONS

M. M. Mckusick et al. Maruzen Co., Ltd., Jun. 30, 1991 pp. 413–433.

* cited by examiner

Primary Examiner—Thomas M. Heckler

(57) ABSTRACT

A method of booting up an information processing apparatus is provided. An operating system is divided into a mini operating system (OS) module having a function of bootstrap and an OS main body module having functions other than the function of bootstrap. The mini OS module can be located in a boot block of a boot device, whereas the OS main body module can be located in a file system of the boot device. A firmware or F/W code module stored in a ROM loads the mini OS module into memory when booting up the information processing apparatus. The mini OS module then loads the OS main body module into memory and then initializes the OS main body module.

12 Claims, 26 Drawing Sheets

OS LOADING AND INITIALIZATION PROCESSING MODULE

OS LOAD PROCESSING MODULE

INFORMATION PROCESSING APPARATUS METHOD OF BOOTING INFORMATION PROCESSING APPARATUS AT A HIGH SPEED

BACKGROUND OF THE INVENTION

1. Field of the Invention

The present invention relates to an information processing apparatus capable of reducing the time required for booting itself when it is powered on, and a method of booting an information processing apparatus at a high speed.

2. Description of the Prior Art

In accordance with a prior art method of booting an information processing apparatus, a firmware or F/W code stored in a programmable read only memory (ROM) loads a bootstrap code, called boot, into memory, as shown in for example "Booting up System", Chapter 13, pp.413–433 in "The Design and Implementation of the UNIX 4.3BSD", translated by Akira Nakamura et al., Maruzen, Jun. 30, 1991. The boot program then loads an operating system or OS stored in a file system into memory. The OS is then started and goes through initialization. After that, the OS starts execution of a first process or program, called init, to be executed first after the OS goes through initialization. Applications can then run on the OS.

Since the prior art method of booting an information processing apparatus comprises the steps of the F/W code loading the bootstrap code stored in a boot block of a boot device into memory, the F/W code starting execution of the bootstrap code, the bootstrap code loading the OS stored in the file system of the boot device into memory, and the bootstrap code starting execution of the OS, much time is required to start execution of the OS. Further, another problem with the prior art method is that since the OS cannot start execution of applications to be started automatically when the information processing apparatus is booted up until the OS finishes going through initialization perfectly, much time is required to start execution of such applications when booting up the information processing apparatus.

SUMMARY OF THE INVENTION

The present invention is made to overcome the above problems. It is therefore an object of the present invention to provide an information processing apparatus and a method capable of reducing the time required for booting up itself when it is powered on, and also reducing the time required to start execution of applications to be started automatically when the information processing apparatus is booted up.

In accordance with an aspect of the present invention, there is provided an information processing apparatus comprising: a boot device divided into a boot block in which a mini operating system (OS) module having a function required for bootstrap processing is located and a file system in which an operating system (OS) main body module having functions other than the function of bootstrap; and a read-only memory or ROM in which a firmware or F/W code module is located for loading the mini OS module located in the boot block into a memory and for starting execution of the mini OS module instead of a bootstrap code when booting up the information processing apparatus, the mini OS module loading the OS main body module from the file system of the boot device into the memory, and the mini OS module being linked to the OS main body module.

In accordance with another aspect of the present invention, there is provided a method of booting up an information processing apparatus comprising a boot device and a memory by loading an operating system into the memory, comprising the steps of: dividing the operating system into a mini operating system (OS) module having a function required for bootstrap processing and an operating system (OS) main body module having functions other than the function of bootstrap, the mini OS module including a mini kernel module that is a basic part of the operating system, a boot device driver module for performing input/output (I/O) operations on the boot device, and an OS loading and initialization processing module for loading the OS main body module into the memory and for initializing the OS main body module; locating the mini OS module in a boot block of the boot device; locating the OS main body module in a file system of the boot device; a firmware or F/W code module being stored in a ROM and loading the mini OS module located in the boot block into the memory when booting up the information processing apparatus; the mini OS module initializing the mini kernel module and the boot device driver module; the mini OS module generating and starting execution of a thread for the OS loading and initialization processing module; and the OS loading and initialization processing module loading the OS main body module stored in the file system into the memory and then initializing the OS main body module.

In accordance with a preferred embodiment of the present invention, the OS main body module is divided into a plurality of functional modules including a device driver module, which are located as separate files in the file system, and the OS loading and initialization processing module is divided into an OS loading processing module for loading each of the plurality of functional modules into the memory and an OS initialization module for initializing each of the plurality of functional modules loaded into the memory by the OS loading processing module. Further, after the mini OS module is loaded into the memory, the mini OS module initializes the mini kernel module and the boot device driver module and then generates and starts execution of a thread for the OS loading processing module. After the thread for the OS loading processing module is started, the OS loading processing module loads each of the plurality of functional modules into the memory and then generates and starts execution of a thread for the OS initialization module every time it loads each of the plurality of functional modules. After the thread for the OS initialization module is started, the OS initialization module initializes each of the plurality of functional modules loaded into the memory.

In accordance with another preferred embodiment of the present invention, the mini OS module includes a thread synchronization module for providing synchronization between a thread for the OS loading processing module and a thread for the OS initialization module using the mini kernel module. Further, the mini OS module generates and starts execution of a thread for the OS loading processing module and a thread for the OS initialization module after the mini OS module initializes the mini kernel module and the boot device driver module. After those threads are started, the OS initialization module brings itself into a state in which it is waiting for a request for initialization of a functional module through the thread synchronization module. Every time the OS loading processing module loads each of the plurality of functional modules into the memory, the OS loading processing module makes a request of the OS initialization module for initialization of each of the plurality of functional modules through the thread synchronization module. The OS initialization module initializes each of the plurality of functional modules loaded into the memory every time the OS initialization module receives a request for initialization of each of the plurality of functional modules loaded into the memory from the OS loading processing module, and then waits for another request for initialization.

In accordance with another preferred embodiment of the present invention, the plurality of functional modules, into which the OS main body module is divided, are stored as compressed files in the file system and the loading and initialization processing module of the mini OS module is divided into an OS loading and decompression processing module and an OS initialization module. Further, the mini OS module generates and starts execution of a thread for the OS loading and decompression processing module after the mini OS module initializes the mini kernel module and the boot device driver module. After the thread for the OS loading and decompression processing module is started, the OS loading and decompression processing module loads each of the plurality of functional modules into the memory and decompresses the loaded functional module, and then generates and starts execution of a thread for the OS initialization module. After the thread for the OS initialization module is executed, the OS initialization module initializes each of the plurality of functional modules loaded into the memory and decompressed.

In accordance with another preferred embodiment of the present invention, the OS loading and decompression processing module is divided into an OS loading processing module and an OS decompression processing module. Further, the mini OS module generates and starts execution of a thread for the OS loading processing module after the mini OS module initializes the mini kernel module and the boot device driver module. After the thread for the OS loading processing module is started, the OS loading processing module loads each of the plurality of compressed functional modules into the memory, and then generates and starts execution of a thread for the OS decompression processing module. After the thread for the OS decompression processing module is started, the OS decompression processing module decompresses each of the plurality of compressed functional module loaded into the memory and then generates and starts execution of a thread for the OS initialization module. And, after the thread for the OS initialization module is started, the OS initialization module initializes each of the functional modules loaded into the memory and decompressed by the OS decompression processing module.

In accordance with another preferred embodiment of the present invention, the OS loading processing module of the mini OS module is an application (AP) execution and OS loading processing module for starting execution of at least a predetermined application module which is located in the file system and which can automatically be started and run on the operating system when booting up the information processing apparatus, and for loading each of the plurality of functional modules into the memory. Further, the predetermined application module includes a function definition file in which some functional modules required for the application module to run on the operating system are listed. After the mini OS module is loaded into the memory, the mini OS module initializes the mini kernel module and the boot device driver module and then generates and starts execution of a thread for the AP execution and OS loading processing module. After the thread for the AP execution and OS loading processing module is started, the AP execution and OS loading processing module loads the application nodule from the file system into the memory and further loads some functional modules required for the application module into the memory according to the function definition file included in the application module, and then generates and starts execution of a thread for the OS initialization module. After the thread for the OS initialization module is started, the OS initialization module then initializes each of the some functional modules loaded into the memory. And, after the initialization of all of the some functional modules is completed, the application execution and OS loading processing module further loads the remainder of all functional modules included in the OS main body module into the memory and initializes the remainder using the OS initialization processing module while starting execution of the application module as a process.

In accordance with another preferred embodiment of the present invention, the OS loading and initialization processing module of the mini OS module is divided into an OS loading processing module and an OS initialization module, the OS main body module is divided into a plurality of blocks of arbitrary record size, each of which includes a loading flag consisting of a plurality of bits respectively corresponding to the plurality of functional modules included in the OS main body module. Further, the loading flag of one of the plurality of blocks including the end of any one of the plurality of functional modules has a corresponding bit set to a predetermined value. After the mini OS module is loaded into the memory, the mini OS module initializes the mini kernel module and the boot device driver module and then generates and starts execution of a thread for the OS loading processing module. After the thread for the OS loading processing module is started, the loading processing module loads each of the plurality of blocks of the OS main body module into the memory, and refers to the loading flag every time it loads each of the plurality of blocks into the memory. Only if a bit of the loading flag is set to a predetermined value, the OS loading processing module generates and starts execution of a thread for the OS initialization module. And, after the thread for the OS initialization module is started, the OS initialization module initializes a corresponding one of the plurality of functional modules loaded into the memory.

In accordance with another preferred embodiment of the present invention, the OS loading and initialization processing module is divided into an OS loading processing module and an OS initialization module, and the OS main body module is divided into a plurality of blocks of arbitrary record size, each of which includes a loading flag. Further, the loading flag of one of the plurality of blocks including the end of any one of the plurality of functional modules has the address of a linkage processing function of linking the one functional module with the mini OS module and the address of an initialization processing function of initializing the one functional module. After the mini OS module is loaded into the memory, the mini OS module initializes the mini kernel module and the boot device driver module and then generates and starts execution of a thread for the OS loading processing module. After the thread for the OS loading processing module is started, the loading processing module loads each of the plurality of blocks of the OS main body module into the memory, and refers to the loading flag every time it loads each of the plurality of blocks into the memory. Only if the loading flag has a value other than zero, the OS loading processing module generates and starts execution of a thread for the OS initialization module. And, after the thread for the OS initialization module is started, the OS initialization module calls a linkage processing function and an initialization processing function according to the value of the loading flag.

In accordance with another preferred embodiment of the present invention, the method further comprises the steps of, in order to generate the mini OS module and the OS main body module, combining an object file of the mini OS module and an object file of the OS main body module into an operating system file by using a linkage editor or linker, and dividing the operating system file into the mini OS module and the OS main body module according to link information.

In accordance with another aspect of the present invention, there is provided a method of booting up an information processing apparatus comprising a boot device and a memory by loading an operating system into the memory, comprising the steps of: dividing the operating system into a mini operating system (OS) module having, a function required for bootstrap processing and an operating system (OS) main body module having functions other than the function of bootstrap, the mini OS module including a mini kernel module that is a basic part of the operating system, a boot device driver module for performing input/output (I/O) operations on the boot device, and an OS loading and initialization processing module for loading the OS main body module into the memory and for initializing the OS main body module; locating the mini OS module in a read-only memory or ROM; locating the OS main body module in a file system of the boot device; a firmware or F/W code module being stored in the ROM and directly executing the mini OS module located in the ROM when booting up the information processing apparatus; the mini OS module loading only data portions of the mini kernel module, the boot device driver module, and the OS loading and initialization processing module into the memory; the mini OS module initializing the mini kernel module and the boot device driver module; the mini OS module generating and starting execution of a thread for the OS loading and initialization processing module; and the OS loading and initialization processing module loading the OS main body module stored in the file system into the memory and then initializing the OS main body-module.

In accordance with another preferred embodiment of the present invention, the mini OS module further includes an address resolve table used for linking the mini OS module with the OS main body module. Further, after the mini OS module generates and starts execution of a thread for the OS loading and initialization processing module, the OS loading and initialization processing module loads the OS main body module into the memory and then initializes it, loads a first process to be executed first, into the memory, loads code portions of the mini kernel module and the boot device driver module into the memory, and writes addresses of the code portions loaded into the memory into the address resolve table.

Further objects and advantages of the present invention will be apparent from the following description of the preferred embodiments of the invention as illustrated in the accompanying drawings.

DETAILED DESCRIPTION OF THE PREFERRED EMBODIMENTS

FIRST EMBODIMENT

Figure 1:
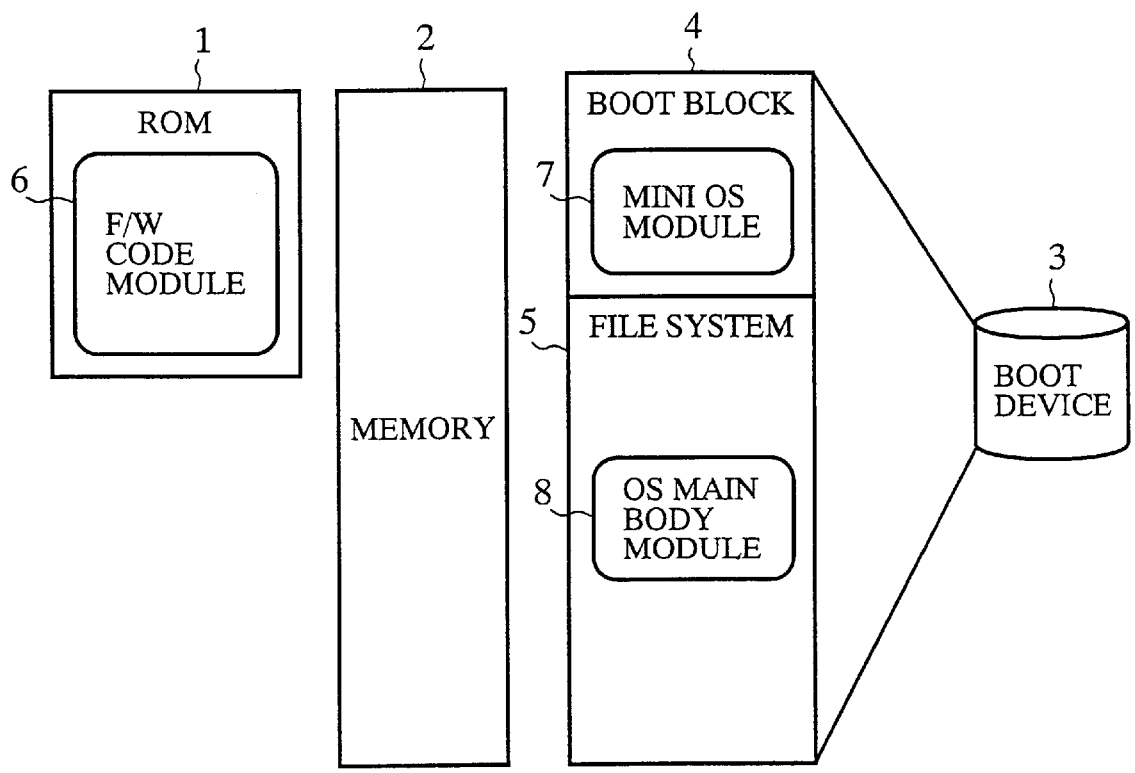
FIG. 1 is a block diagram showing the structure of an information processing apparatus according to a first embodiment of the present invention.

Referring next to FIG. 1, there is illustrated a block diagram showing the structure of an information processing apparatus according to a first embodiment of the present invention. In the figure, reference numeral 1 denotes a ROM of the information processing apparatus, 2 denotes a memory of the information processing apparatus, 3 denotes a boot device of the information processing apparatus, 4 denotes a boot block in the boot device 3, 5 denotes a file system in the boot device 3, and 6 denotes a firmware or F/W code module stored in the ROM 1. The FI/W code module 6 is directly executed on the ROM 1 so as to load data from the boot block 4 in the boot device 3 into the memory 2 and then assume that the loaded data is a code and execute the code after setting up and running diagnostic checks on a hardware or H/W register. Further, reference numeral 7 denotes a mini operating system (OS) module complied and liked in the same way as ordinary program files and located in the boot block 4 within the boot device, the mini OS module having OS functions required for bootstrap processing, and 8 denotes an OS main body module located in the file system 5 within the boot device and provided with OS functions except the OS functions included in the mini OS module 7. When the information processing apparatus is powered on, it goes through initialization and transfers control to the F/W code module 6 stored in the ROM 1.

Figure 2:
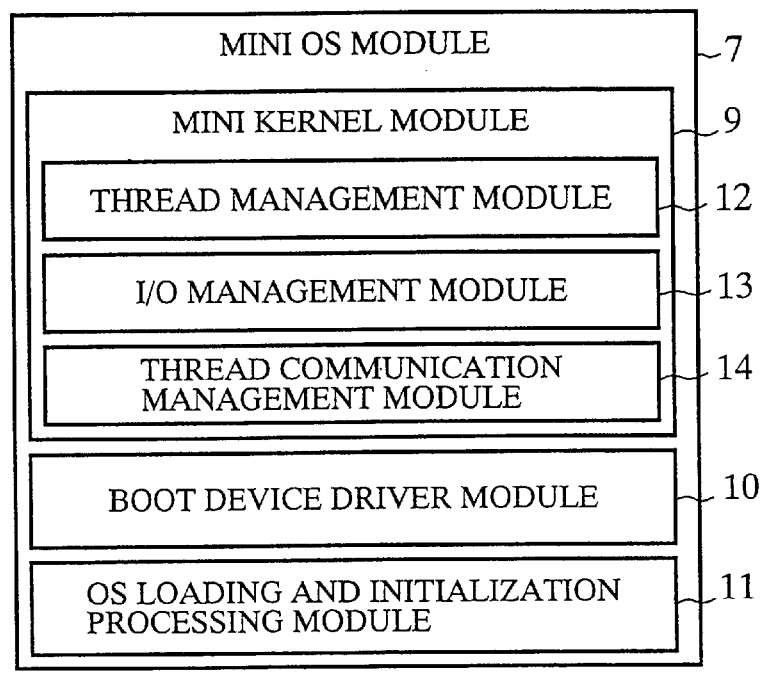
FIG. 2 is a diagram showing the structure of a mini OS module stored in a boot block of a boot device of the information processing apparatus according to the first embodiment of the present invention.

Referring next to FIG. 2, there is illustrated a diagram showing the structure of the mini OS module 7 stored in the boot block of the boot device of the information processing apparatus according to the first embodiment of the present invention. As shown in the figure, the mini OS module 7 consists of a mini kernel module 9 which is a basic part of the OS, a boot device driver module 10 for performing I/O operations on the boot device 3, and an OS loading and initialization processing module 11 for loading the OS main body module 8 from the boot device 3 into the memory 2 and for executing the initialization of the OS main body module 8. The mini kernel module 9 consists of a thread management module 12 for implementing parallel execution of threads, an input/output (I/O) management module 13 for managing device drivers and for supporting input/output (I/O) interrupts, and a thread communication management module 14 for ensuring synchronization between threads. The boot device driver module 10 has the same driver structure as typical BOSS and is managed by the I/O management module 13 of the mini kernel module 9. The OS loading and initialization processing module 11, which is started up as a thread, has access to the boot device driver module 10 by way of the I/O management module 13.

Figure 3:
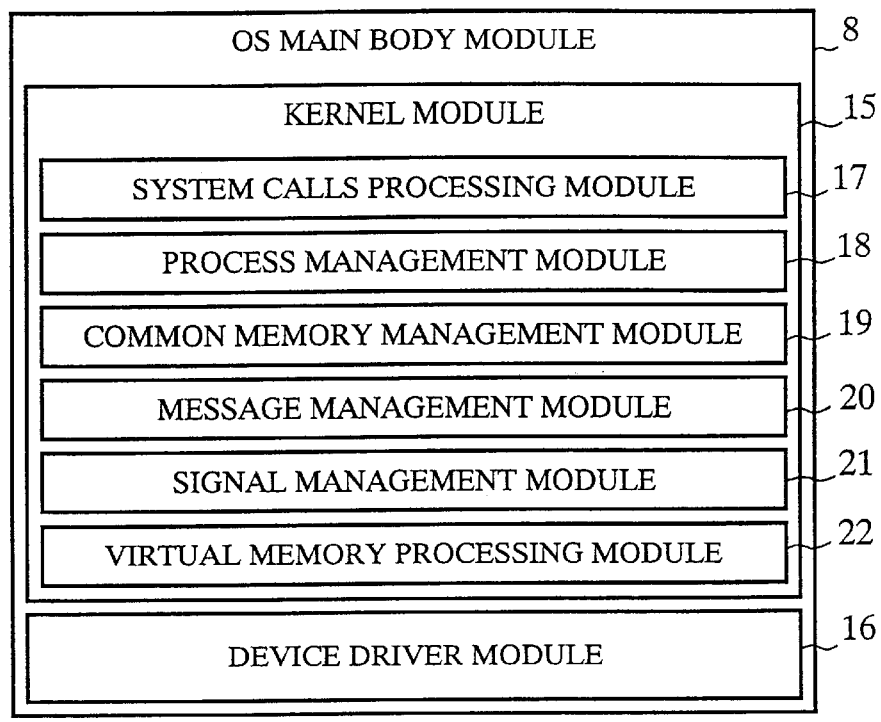
FIG. 3 is a diagram showing the structure of an OS main body module of the information processing apparatus according to the first embodiment of the present invention.

Referring next to FIG. 3, there is illustrated a diagram showing the structure of the OS main body module 8 of the information processing apparatus according to the first embodiment of the present invention. As shown in the figure, the OS main body module 8 consists of a kernel module 15 having kernel functions except the functions included in the mini kernel module 9 of FIG. 2, and a device driver module 16 for performing I/O operations on devices (not shown) except the boot device 3. The kernel module 15 includes a system call processing module 17 for interfacing between user programs and the kernel, a process management module 18 for implementing operations as processes of user programs, a common memory management module 19 for enabling processes to refer to an identical memory or a common memory, a message management module 20 for implementing message transmissions and receptions between processes, a signal management module 21 for implementing signaling as asynchronous communication between processes, a virtual memory processing module 22 for implementing a swap function, and soon. The OS main body module 8 is located within the file system 5 of the boot device 3 and is loaded into the memory 2 by the mini OS module 7. The OS main body module 8 then goes through initialization.

Figure 4:
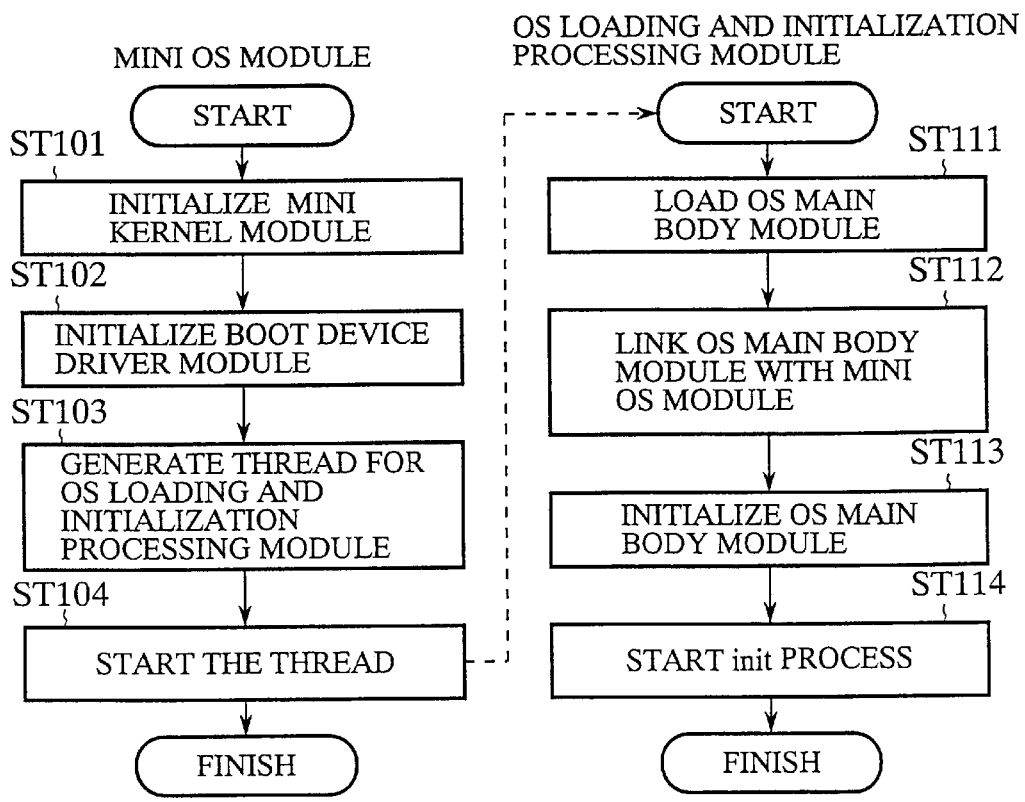
FIG. 4 is a flow chart showing operations of the mini OS module of the information processing apparatus according to the first embodiment of the present invention.

Referring next to FIG. 4, there is illustrated a flow chart showing operations of the mini OS module 7 of the information processing apparatus according to the first embodiment of the present invention. The F/W code module 6 loads the mini OS module 7 into the memory 2 and transfers control to the mini OS module 7. The mini OS module 7 then, in step ST101, executes initialization of the mini kernel module 9. In this case, the thread management module 12, the I/O management module 13, and the thread communication management module 14 are initialized and their functions are available now. Next, the mini OS module 7, in step ST102, executes initialization of the boot device driver module 10. The boot device driver module 10 registers an interrupt request from the boot device into an interrupt table of the I/O management module 13 so as to handle the interrupt request, and generates and starts execution of a thread for boot device I/O processing by using the thread management module 12. The boot device driver module 10 further keeps synchronization between interrupt services and the boot device I/O processing that is started as a thread, by using the thread communication management module 14. Interfaces between drivers and another module for I/O processing such as the OS loading and initialization processing module 11 are registered into the I/O management module 13. For example, all other modules have access to the boot device driver module 10 by way of the I/O management module 13.

The mini OS module 7, in step ST103, generates a thread for the OS loading and initialization processing module 11 by using the thread management module 12. The mini OS module 7 further, in step ST104, starts execution of the thread by using the thread management module 12. The OS loading and initialization processing module 11 is thus started up as the thread. After that, the mini OS module 7 transfers control to the OS loading and initialization processing module 11.

Next, the OS loading and initialization processing module 11, in step ST111, loads the OS main body module 8 stored in the file system 5 of the boot device 3 into the memory 2 by using the boot device driver module 10. The OS loading and initialization processing module 11 then, in step ST112, links the OS main body module 8 loaded into the memory 2 with the mini OS module 7, i.e. combines the OS main body module 8 and the mini OS module 7 into one program. The OS loading and initialization processing module 11 resolves the addresses of code and data in the mini OS module 7, which are not-yet-defined in the OS main body module 8, and the address of code and data in the OS main body module 8, which are not-yet-defined in the mini OS module 7. As a result, the OS main body module 8 has access to the mini OS module 7, and the mini OS module 7 has access to the OS main body module 8.

The OS loading and initialization processing module 11 then, in step ST113, executes initialization of the OS main body module 8. To be more specific, the OS loading and initialization processing module 11 initializes the plurality of functional modules within the kernel module 15, such as the system call processing module 17, the process management module 18, the common memory management module 19, the message management module 20, and the signal management module 21, and the virtual memory processing module 22, and also initializes the device driver module 16 including device drivers except the boot device driver. The functional modules within the mini kernel module 9 of the mini OS module 7, such as the thread management module 12, the I/O management module 15, and the thread communication management module 14, serve as basic functional part of the functional modules within the kernel module 15. In other words, the process management module 18 calls the thread management module 12 when performing processing about threads, such as generating a thread. Similarly, the message management module 20 calls the thread communication management module 14 when keeping synchronization between threads.

The I/O management module 13 also serves as basic part of the device driver module 16 of the OS main body module 8. For example, the I/O management module 13 implements the registration of interrupt services for devices and manages input/output (I/O) interfaces in behalf of the device driver module 16. In performing step-ST113, when the initialization of the OS main body module 8 is completed, the OS loading and initialization processing module 11 loads the first process, called init, to be executed first after booting up the information processing apparatus, from the file system 5 into the memory 2. The OS loading and initialization processing module 11 then, in step ST114, starts execution of the first process (init process). Thus, the initialization of the OS is completed.

As previously mentioned, in accordance with the first embodiment of the present invention, the OS is divided into the mini OS module 7 for performing the boot process and the OS main body module E for performing processes except the boot process. Further, the mini OS module 7 is located in the boot block of the boot device, whereas the OS main body module 8 is located in the file system of the boot device. The F/W code module 6 loads the mini OS module 7 into the memory 2 and then starts execution of the mini OS module 7. The mini OS module 7 then loads the OS main body module 8 from the file system into the memory 2 and initializes the OS main body module 8. Accordingly, the first embodiment of the present invention provides an advantage of being able to reduce the time required for booting up the information processing apparatus.

SECONG EMBODIMENT

Figure 5:
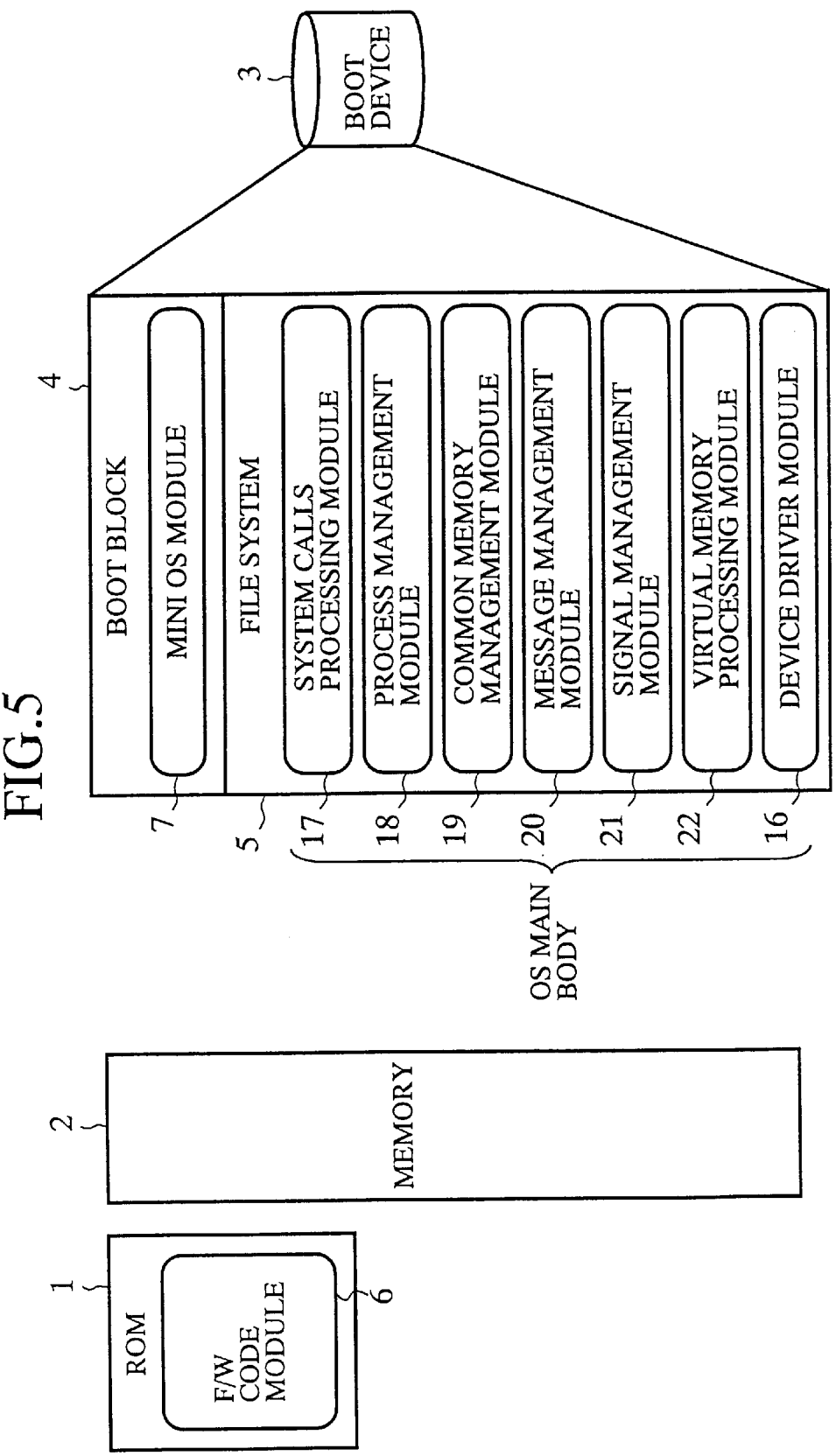
FIG. 5 is a block diagram showing the structure of an information processing apparatus according to a second embodiment of the present invention.

Referring next to FIG. 5, there is illustrated a block diagram showing the structure of an information processing apparatus according to a second embodiment of the present invention. In the figure, the same reference numerals as shown in FIG. 1 designate the same or like elements, and therefore the description of those elements will be omitted hereinafter. Like the OS of the first embodiment, the OS of the second embodiment is divided into a mini OS module 7 and a main body of the OS. The main body is further divided into a plurality of functional modules, such as a system call processing module 17, a process management module 18, a common memory management module 19, a message management module 20, a signal management module 21, a virtual memory processing module 22, and a device driver module 16. The plurality of functional modules are separately stored as files in a file system 5 of a boot device 3.

Figure 6:
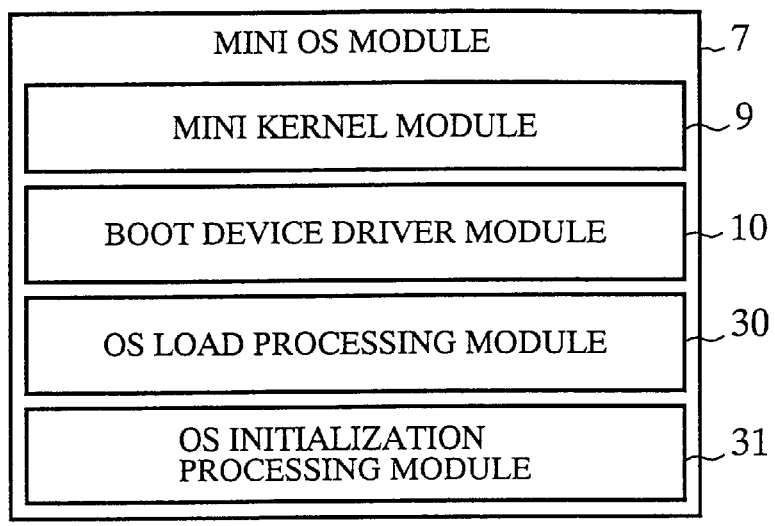
FIG. 6 is a diagram showing the structure of a mini OS module of the information processing apparatus according to the second embodiment of the present invention.

Referring next to FIG. 6, there is illustrated a diagram showing the structure of the mini OS module stored in the boot block of the boot device of the information processing apparatus according to the second embodiment of the present invention. As shown in the figure, the mini OS module 7 of the second embodiment consists of a mini kernel module 9 which is the basic part of the OS, a boot device driver module 10 for performing I/O operations on the boot device 3, an OS load processing module 30 for loading the OS main body from the boot device 3 into a memory 2, and an initialization processing module 31 for executing the initialization of the OS main body.

Figure 7:
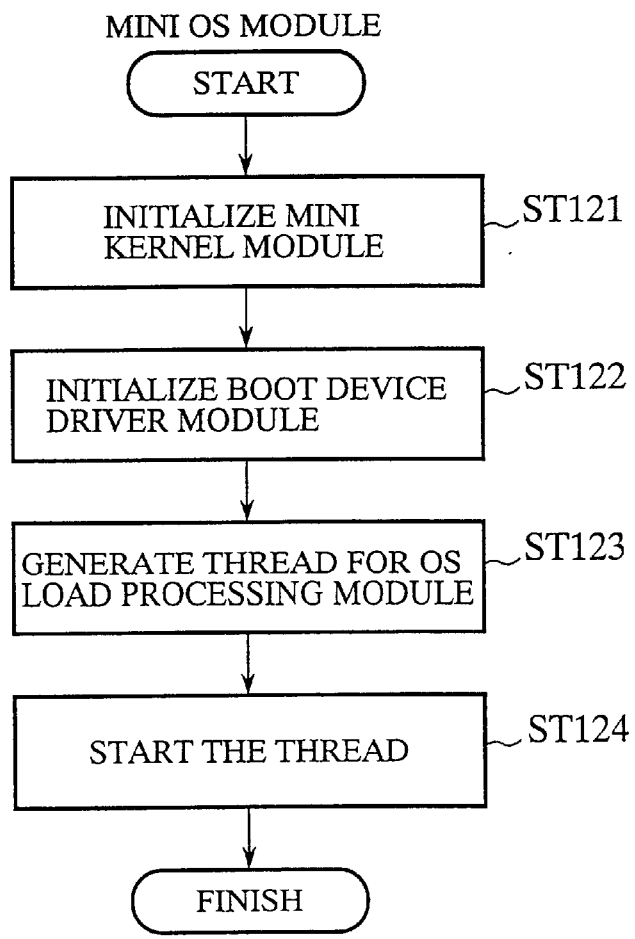
FIG. 7 is a flow chart showing operations of the mini OS module of the information processing apparatus according to the second embodiment of the present invention.

Referring next to FIG. 7, there is illustrated a flow chart showing operations of the mini OS module of the information processing apparatus according to the second embodiment of the present invention. The F/W code module 6 loads the mini OS module 7 into the memory 2 and transfers control to the mini OS module 7. The mini OS module 7 then, instep ST121, executes initialization of the mini kernel module 9. The mini OS module 7 in turn, in step ST122, executes initialization of the boot device driver module 10. After that, the mini OS module 7, in step ST123, generates a thread for the OS load processing module 30. The mini OS module 7 then, in step ST124, starts execution of the thread for the OS load processing module 30. After that, the mini OS module 7 transfers control to the OS load processing module 30.

Figure 8:
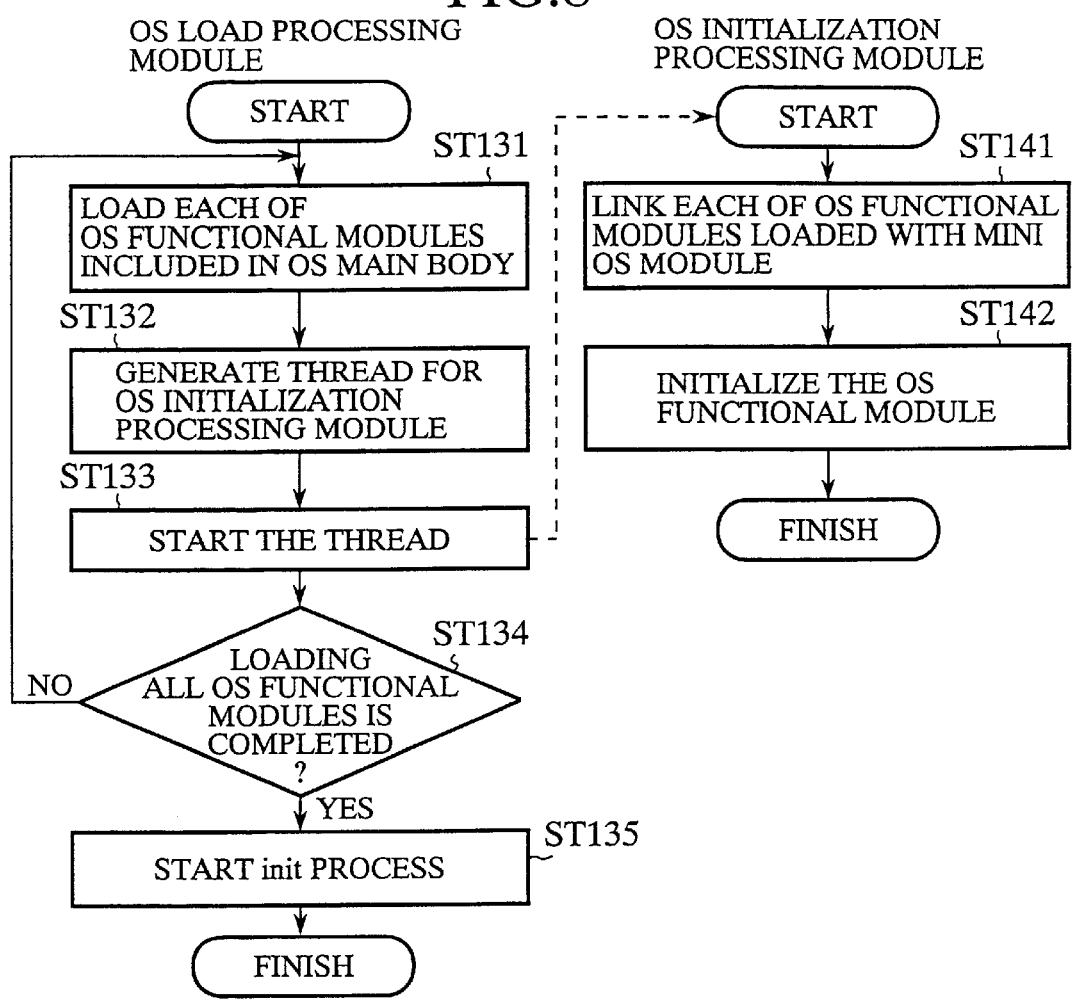
FIG. 8 is a flow chart showing operations of an OS load processing module and an OS initialization processing module of the information processing apparatus according to the second embodiment of the present invention.

Referring next to FIG. 8, there is illustrated a flow chart showing operations of the OS load processing module 30 and the OS initialization processing module 31 of the information processing apparatus according to the second embodiment of the present invention. The thread for the OS load processing module 30 to which control from the mini OS module 7 has been transferred, in step ST131, loads the main body of the OS stored in the file system 5 of the boot device 3, including the separate files such as the system call processing module 17, the process management module 18, the common memory management module 19, the message management module 20, the signal management module 21, the virtual memory processing module 22, and the device driver module 16, into the memory 2. In performing step ST131, the OS load processing module 30 loads any one of those functional modules 16 to 22 first. After that, the OS load processing module 30 then, in step ST132, generates a thread for the OS initialization processing module 31 and starts execution of the thread for the OS initialization processing module 31, in step ST133. After that, the OS load processing module 30 and the OS initialization processing module 31 can be executed in parallel with each other.

The OS load processing module 30 then, in step ST134, checks whether or not the whole of the main body of the OS has been loaded, that is, whether or not all the functional modules 16 to 22 have been loaded into the memory 2. If all the functional modules 16 to 22 have not been loaded into the memory 2 yet, the OS load processing module 30 returns to step ST131 in which it continues to load the remaining functional modules of the OS main body. On the other hand, when the checking result in step ST134 shows that the load processing is completed, the first process, called init, to be executed first is loaded from the file system 5 into the memory 2 and is then started, in step ST135.

When the OS initialization processing module 31 is started as a thread, it, in step ST141, links the loaded functional module, i.e. any one of the system call processing module 17, the process management module 18, the common memory management module 19, the message management module 20, the signal management module 21, the virtual memory processing module 22, and the device driver module 16, which has been loaded into the memory, with the mini OS module 7. The OS initialization processing module 31 then, in step ST142, initializes the loaded functional module and completes the initialization processing. In this manner, every time each of the plurality of functional modules 16 to 22 that construct the main body of the OS is loaded into the memory 2, one thread for the OS initialization processing module 31 is generated and started in steps ST132 and ST133 by the OS load processing module 30.

As previously mentioned, in accordance with the second embodiment of the present invention, the main body of the OS is divided into a plurality of functional modules according a plurality of functions to be performed by the main body of the OS. Further, the plurality of functional modules are separately stored in the file system 5. In addition, the OS load processing and the OS initialization processing can be performed in parallel with each other after any one of the plurality of functional modules of the OS main body is loaded into the memory. As a result, while the CPU waits for the occurrence of an event in performing the OS load or initialization processing, the CPU does not idle but the CPU performs another processing. Accordingly, the second embodiment of the present invention provides an advantage of being able to further reduce the time required for booting up the information processing apparatus.

THIRD EMBODIMENT

Figure 9:
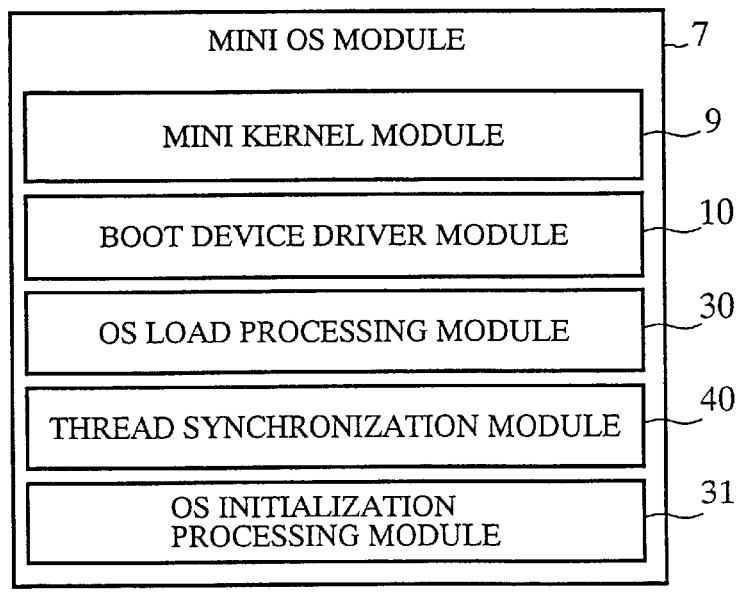
FIG. 9 is a diagram showing the structure of a mini OS module of an information processing apparatus according to a third embodiment of the present invention.

Referring next to FIG. 9, there is illustrated a block diagram showing the structure of a mini OS module of an information processing apparatus according to a third embodiment of the present invention. In the figure, the same reference numerals as shown in FIGS. 2 and 6 designate the same or like elements, and therefore the description of those elements will be omitted hereinafter. Like the mini OS module 7 of the second embodiment, the mini OS module 7 of the third embodiment is provided with a mini kernel module 9, a boot device driver module 10, an OS load processing module 30, and an OS initialization processing module 31. The mini OS module 7 of the third embodiment further includes a thread synchronization module 40 for maintaining synchronization between the OS load processing module 30 and the OS initialization processing module 31.

Figure 10:
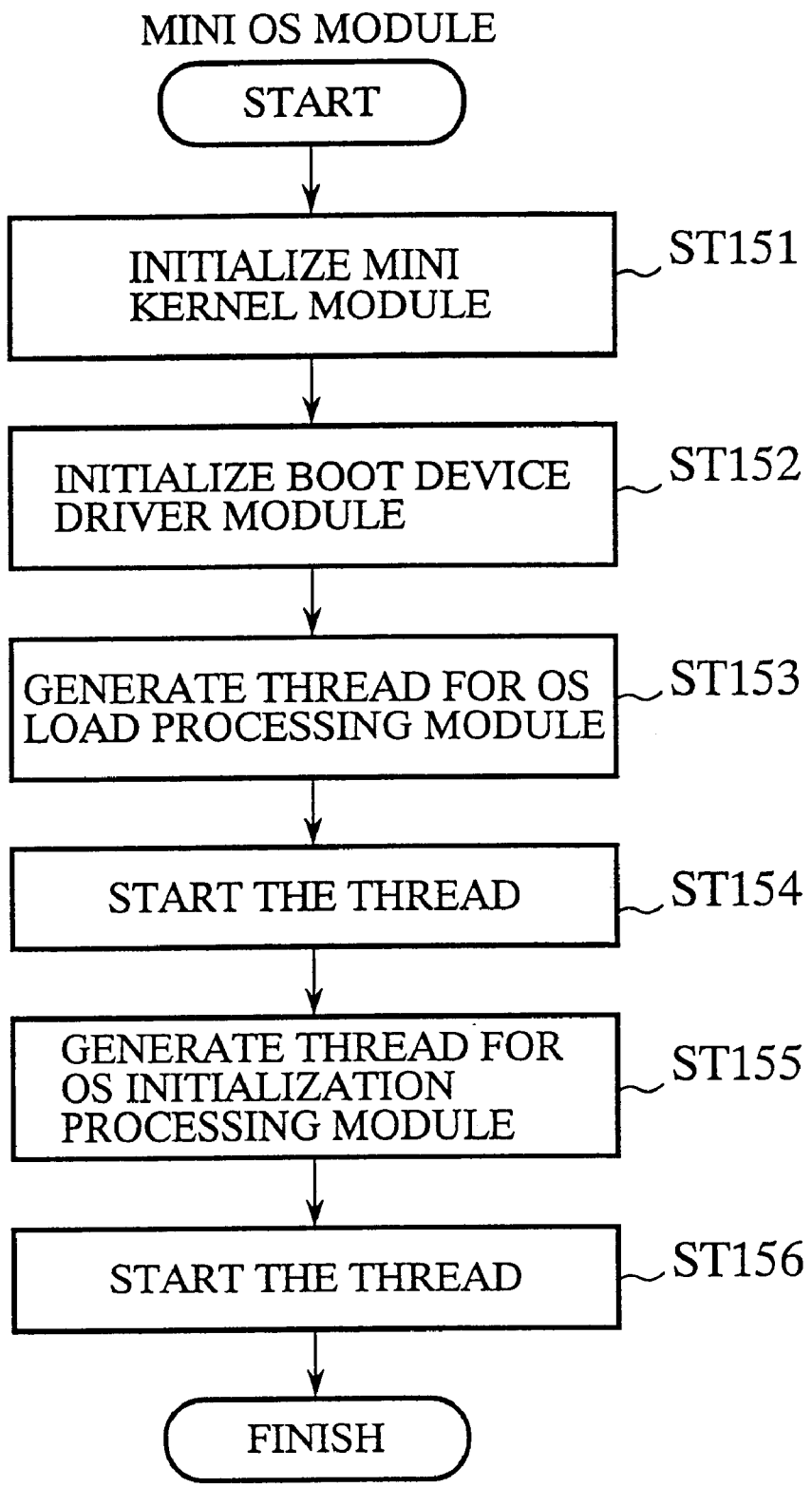
FIG. 10 is a flow chart showing operations of the mini OS module of the information processing apparatus according to the third embodiment of the present invention.

Referring next to FIG. 10, there is illustrated a flow chart showing operations of the mini OS module of the information processing apparatus according to the third embodiment of the present invention. The F/W code module 6 loads the mini OS module 7 into the memory 2 and transfers control to the mini OS module 7. The mini OS module 7 then, instep ST151, executes initialization of the mini kernel module 9. The mini OS module 7 in turn, in step ST152, executes initialization of the boot device driver module 10. After that, the mini OS module 7, in step ST153, generates a thread for the OS load processing module 30. The mini OS module 7 then, in step ST154, starts execution of the thread for the OS load processing module 30. Further, the mini OS module 7, in step ST155, generates a thread for the OS initialization processing module 31. The mini OS module 7 then, in step ST156, starts execution of the thread for the OS initialization processing module 31. After that, both the OS load processing module 30 and the OS initialization processing module 31 can be executed in parallel with each other.

Figure 11:
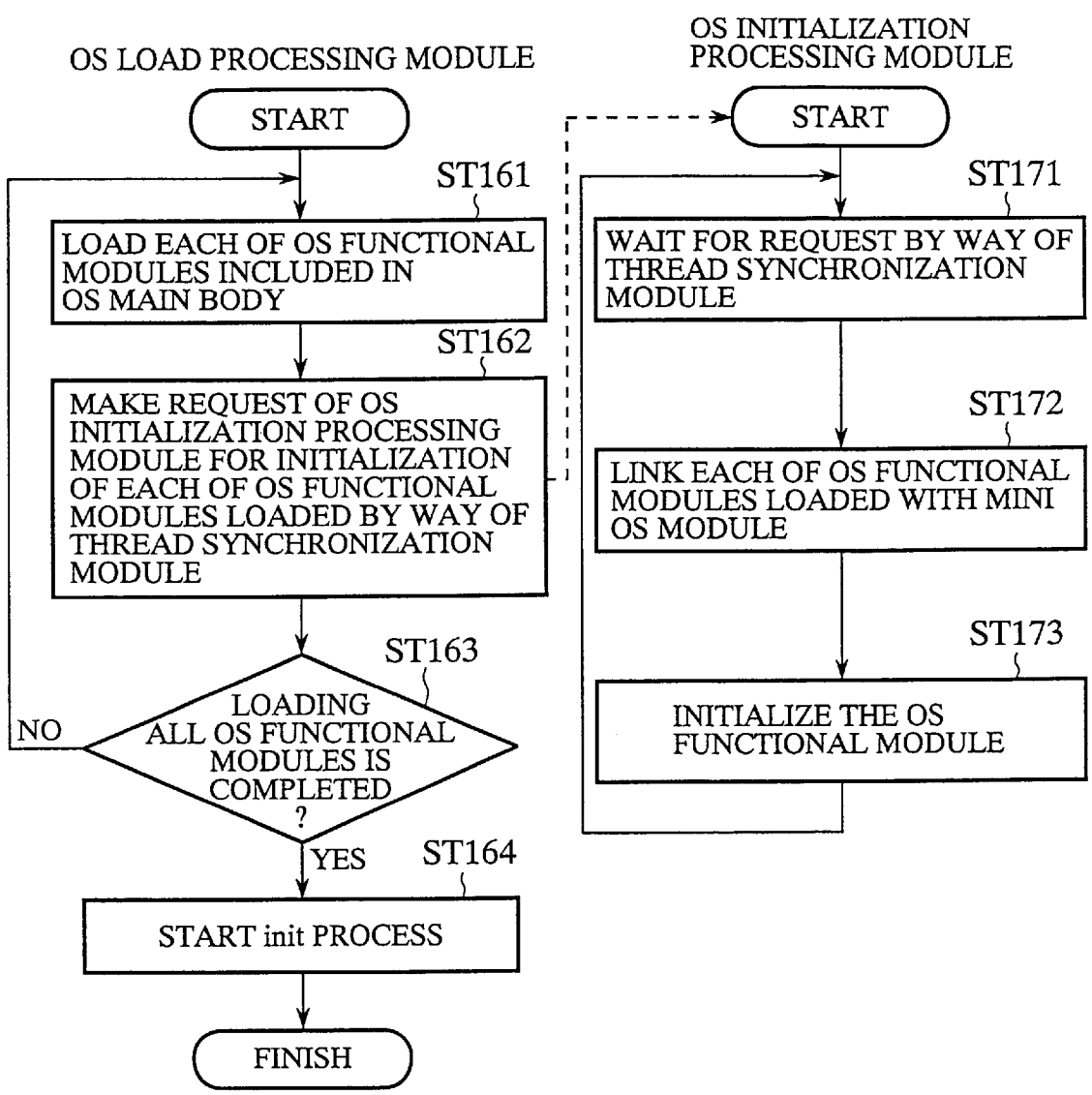
FIG. 11 is a flow chart showing operations of an OS load processing module and an OS initialization processing module of the information processing apparatus according to the third embodiment of the present invention.

Referring next to FIG. 11, there is illustrated a flow chart showing operations of the OS load processing module 30 and the OS initialization processing module 31 of the information processing apparatus according to the third embodiment of the present invention. The OS load processing module 30 which has been started as a thread by the mini OS module 7, in step ST161, starts loading the main body of the OS stored in the file system 5 of the boot device 3, including the functional modules such as the system call processing module 17, the process management module 18, the common memory management module 19, the message management module 20, the signal management module 21, the virtual memory processing module 22, and the device driver module 16, into the memory 2. In performing step ST161, the OS load processing module 30 loads any one of those functional modules 16 to 22 first. The OS load processing module 30 then, in step ST162, makes an initialization request of the OS initialization processing module 31 for the OS initialization processing by way of the thread synchronization module 40. The OS load processing module 30 then, in step ST163, checks whether or not the whole of the main body of the OS has been loaded, that is, whether or not all the functional modules 16 to 22 have been loaded into the memory 2.

If all the functional modules 16 to 22 have not been loaded into the memory 2 yet, the OS load processing module 30 returns to step ST161 in which it continues to load the remaining functional modules of the OS. On the other hand, when the loading of the whole of the main body of the OS is completed, the OS load processing module 30 loads the first process, called init, to be executed first from the file system 5 into the memory 2 and starts execution of the init process, in step ST164.

When the OS initialization processing module 31 is started as a thread by the mini OS module 7, it, in step ST171, waits for an initialization request from the OS load processing module 30 by way of the thread synchronization module 40. When the OS initialization processing module 31 receives an initialization request made, in step ST162, by the OS load processing module 30, it links the loaded functional module with the mini OS module 7, in step ST172. The OS initialization processing module 31 then, in step ST173, initializes the loaded functional module and returns to step ST171 in which it waits for another initialization request from the OS load processing module 30 by way of the thread synchronization module 40.

As previously mentioned, in accordance with the third embodiment of the present invention, the information processing apparatus can maintain synchronization between one thread used by the OS load processing module 30 for loading the OS main body into memory and another thread used by the OS initialization processing module 31 for initializing the OS main body by using the thread synchronization module 40, without having to create and terminate a thread to be used by the OS initialization processing module 31. Accordingly, the third embodiment of the present invention provides an advantage of being able to further reduce the time required for booting up the information processing apparatus.

FOURTH EMBODIMENT

Figure 12:
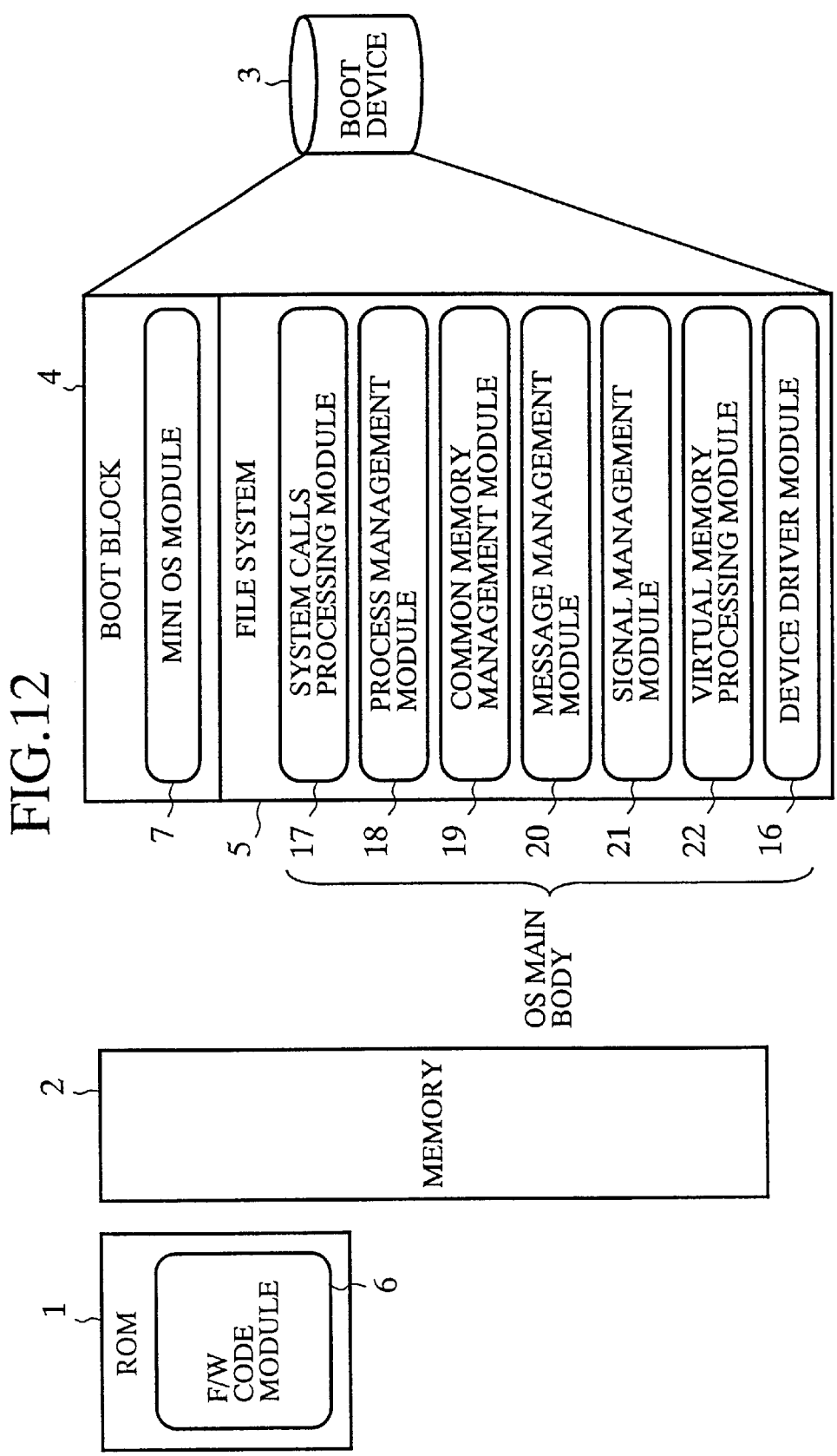
FIG. 12 is a block diagram showing the structure of an information processing apparatus according to a fourth embodiment of the present invention.

Referring next to FIG. 12, there is illustrated a block diagram showing the structure of an information processing apparatus according to a fourth embodiment of the present invention. In the figure, the same reference numerals as shown in FIG. 5 designate the same or like elements, and therefore the description of those elements will be omitted hereinafter. Like the OS of the second embodiment, the OS of the second embodiment is divided into a mini OS module 7 and a main body of the OS, and the main body is further divided into a plurality of functional modules, such as a system call processing module 17, a process management module 18, a common memory management module 19, a message management module 20, a signal management module 21, a virtual memory processing module 22, and a device driver module 16. The plurality of functional modules are separately stored as compressed files in a file system 5 of a boot device 3.

Figure 13:
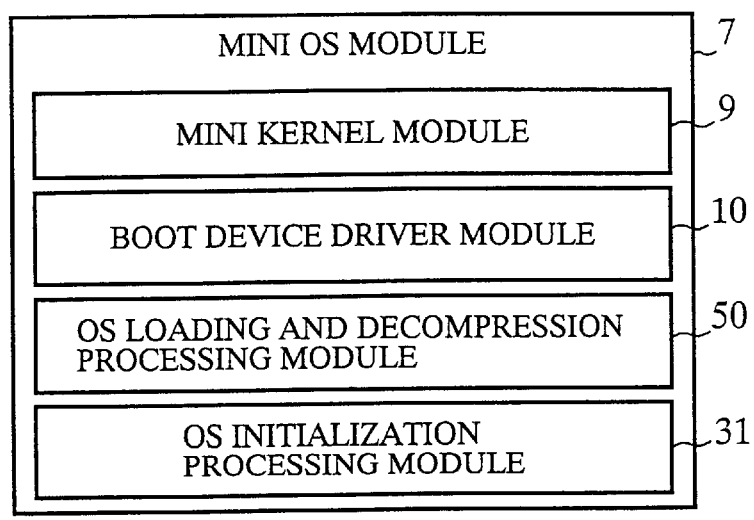
FIG. 13 is a diagram showing the structure of a mini OS module of the information processing apparatus according to the fourth embodiment of the present invention.

Referring next to FIG. 13, there is illustrated a block diagram showing the structure of the mini OS module 7 of the information processing apparatus according to the fourth embodiment of the present invention. Like the mini OS module 7 of the second embodiment as shown in FIG. 6, the mini OS module 7 of the fourth embodiment is provided with a mini kernel module 9, a boot device driver module 10, and an OS initialization processing module 31. The mini OS module 7 of the fourth embodiment further comprises an OS loading and decompression processing module 50 having a function of decompressing a loaded functional module in addition to the function of the OS load processing module 30 of the second embodiment, instead of the OS load processing module 30.

Figure 14:
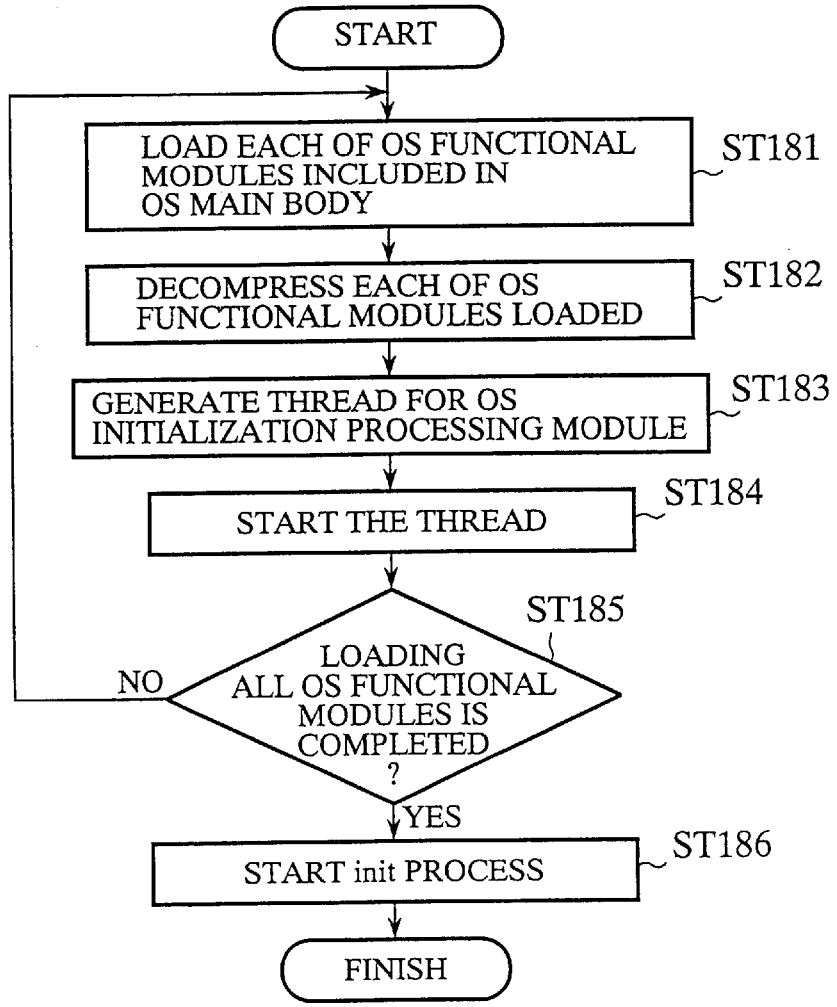
FIG. 14 is a flow chart showing operations of an OS loading and decompression processing module of the information processing apparatus according to the fourth embodiment of the present invention.

Referring next to FIG. 14, there is illustrated a flow chart showing operations of the OS loading and decompression processing module 50 of the information processing apparatus according to the fourth embodiment of the present invention. The OS loading and decompression processing module 50 to which control from the mini OS module 7 has been transferred, in step ST181, loads the main body of the OS stored in the file system 5 of the boot device 3, such as the system call processing module 17, the process management module 18, the common memory management module 19, the message management module 20, the signal management module 21, the virtual memory processing module 22, and the device driver module 16, into the memory 2. In performing step ST181, the OS loading and decompression processing module 50 loads any one of those functional modules 16 to 22 first. The OS loading and decompression processing module 50 then, in step ST182, decompresses one functional module loaded into the memory. Since the plurality of functional modules 16 to 22 are stored as compresses files in the file system 5 of the boot device, the functional module loaded into the memory 2 is compressed data. Therefore, in performing step ST182, the OS loading and decompression processing module 50 decompresses the compressed data so as to convert it into executable code and data.

The OS loading and decompression processing module 50 then, in step ST183, generates a thread for the OS initialization processing module 31 and starts execution of the thread for the OS initialization processing module 31, in step ST184. After that, the OS initialization processing module 31 executes initialization of the loaded and decompressed OS functional module. The OS loading and decompression processing module 50 then, in step ST185, checks whether or not the whole of the main body of the OS has been loaded, that is, whether or not all the functional modules 16 to 22 have been loaded into the memory 2. If all the functional modules 16 to 22 have not been loaded into the memory 2 yet, the OS loading and decompression processing module 50 returns to step ST181 in which it continues to load the remaining functional modules of the OS main body. On the other hand, when the loading of all the OS functional modules is completed, the OS loading and decompression processing module loads the first process, called init, to be executed first from the file system 5 into the memory 2 and starts execution of the first process, in step STI186.

As previously mentioned, in accordance with the fourth embodiment of the present invention, the main body of the OS is divided into a plurality of functional modules according a plurality of functions to be performed by the main body, and the plurality of functional modules are stored as compressed files in the file system 5 of the boot device. Further, the OS loading and decompression processing module 50 decompresses each of the plurality of functional modules each time it loads each of them into memory. As a result, the time required for I/O processing can be reduced.

Accordingly, the fourth embodiment of the present invention provides an advantage of being able to further reduce the time required for booting up the information processing apparatus.

FIFTH EMBODIMENT

Figure 15:
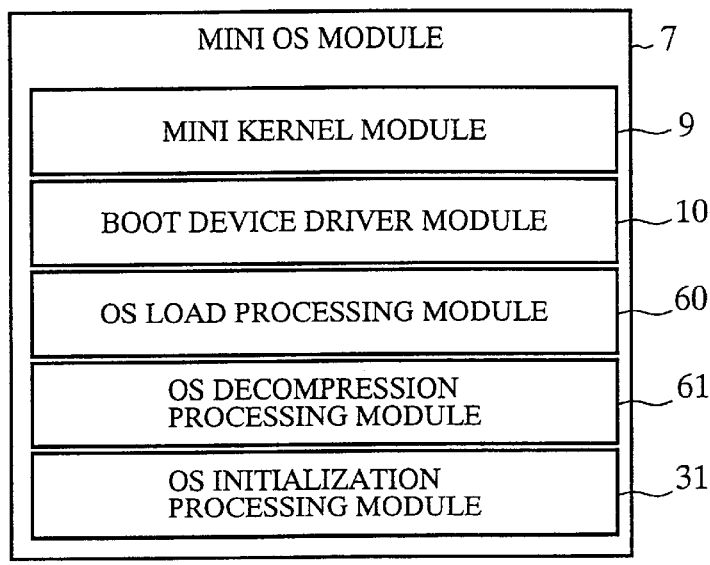
FIG. 15 is a diagram showing the structure of a mini OS module of an information processing apparatus according to a fifth embodiment of the present invention.

Referring next to FIG. 15, there is illustrated a block diagram showing the structure of a mini OS module of an information processing apparatus according to a fifth embodiment of the present invention. In the figure, the same reference numerals as shown in FIG. 13 designate the same or like elements, and therefore the description of those elements will be omitted hereinafter. Like the mini OS module of the fourth embodiment mentioned above, the mini OS module 7 of the fifth embodiment comprises a mini kernel module 9, a boot device driver module 10, and an OS initialization processing module 31. Further, the mini OS module 7 of the fifth embodiment includes an OS load processing module 60 and an OS decompression processing module 61, instead of the OS loading and decompression processing module 50 of the fourth embodiment.

Figure 16:
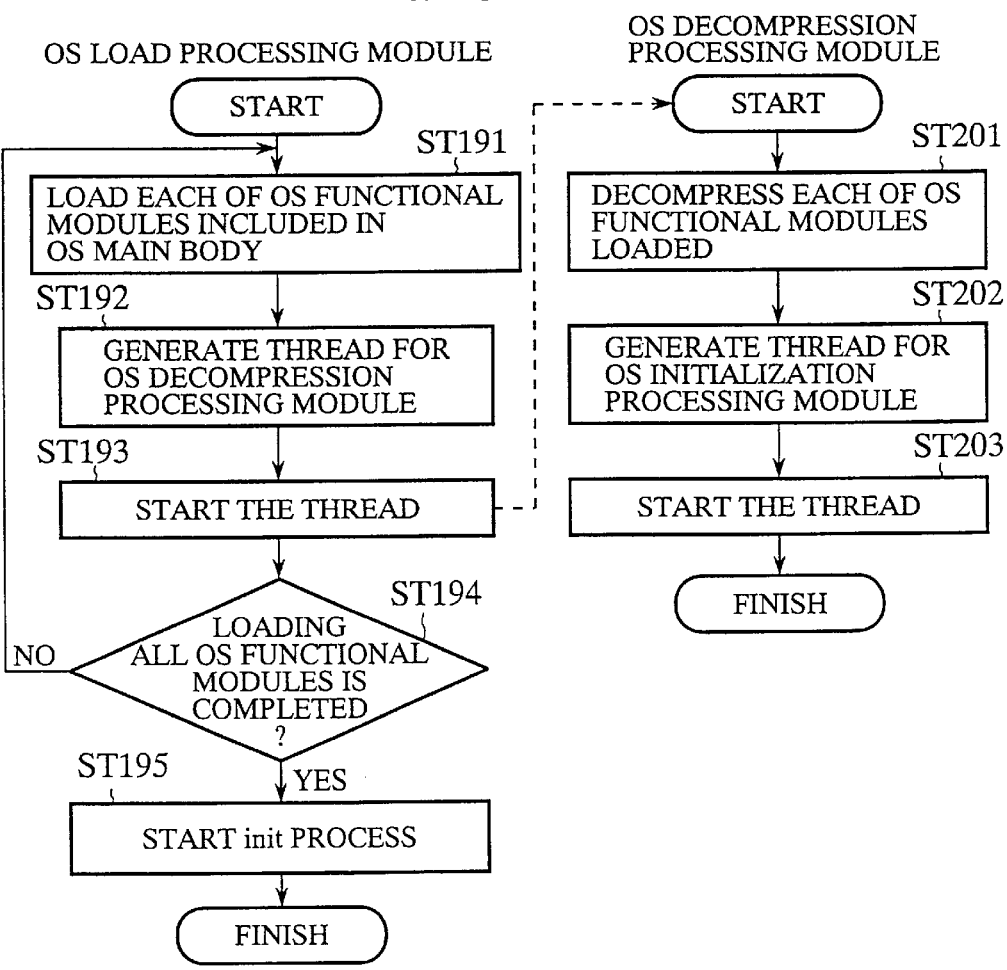
FIG. 16 is a flow chart showing operations of an OS load processing module and an OS decompression processing module of the information processing apparatus according to the fifth embodiment of the present invention.

Referring next to FIG. 16, there is illustrated a flow chart showing operations of the OS load processing module 60 and the OS decompression processing module 61 of the information processing apparatus according to the fifth embodiment of the present invention. The OS load processing module 60 to which control from the mini OS module 7 has been transferred, in step ST191, sequentially loads a plurality of OS functional modules 16 to 22 stored in the file system 5 into the memory 2. In performing step ST191, the OS load processing module 60 loads any one of those functional modules 16 to 22 first. The OS load processing module 60 then, in step ST192, generates a thread for the OS decompression processing module 61 and starts execution of the thread, in step ST193. The OS decompression processing module 61 thus starts execution. After that, both the OS load processing module 60 and the OS decompression processing module 61 can be executed in parallel with each other.

The OS load processing module 60 then, in step ST194, checks whether or not the whole of the main body of the OS has been loaded, that is, whether or not all the functional modules 16 to 22 have been loaded into the memory 2. If all the functional modules 16 to 22 have not been loaded into the memory 2 yet, the OS load processing module 60 returns to step ST191 in which it continues to load the remaining functional modules of the OS main body. On the other hand, when the loading of all the OS functional modules is completed, the OS load processing module 60 loads the first process, called init, to be executed first from the file system 5 into the memory 2 and starts execution of the first process, in step ST195. When the OS decompression processing module 61 is started up as a thread, it decompresses one of the plurality of functional module 16 to 22, which has been loaded into the memory, in step ST201. The OS decompression processing module 61 then, in step ST202, generates a thread for the OS initialization processing module 31 and, in step ST203, starts execution of the thread for the OS initialization processing module 31. After that, the OS initialization processing module 31 starts initialization of the loaded and decompressed OS functional module.

As previously mentioned, in accordance with the fifth embodiment of the present invention, the information processing apparatus can perform the OS load processing and the decompression processing in parallel. As a result, while the CPU waits for the occurrence of an event in performing the OS load or decompression processing, the CPU does not idle but the CPU performs another processing. Accordingly, the fifth embodiment of the present invention provides an advantage of being able to further reduce the time required for booting up the information processing apparatus.

SIXTH EMBODIMENT

Figure 17:
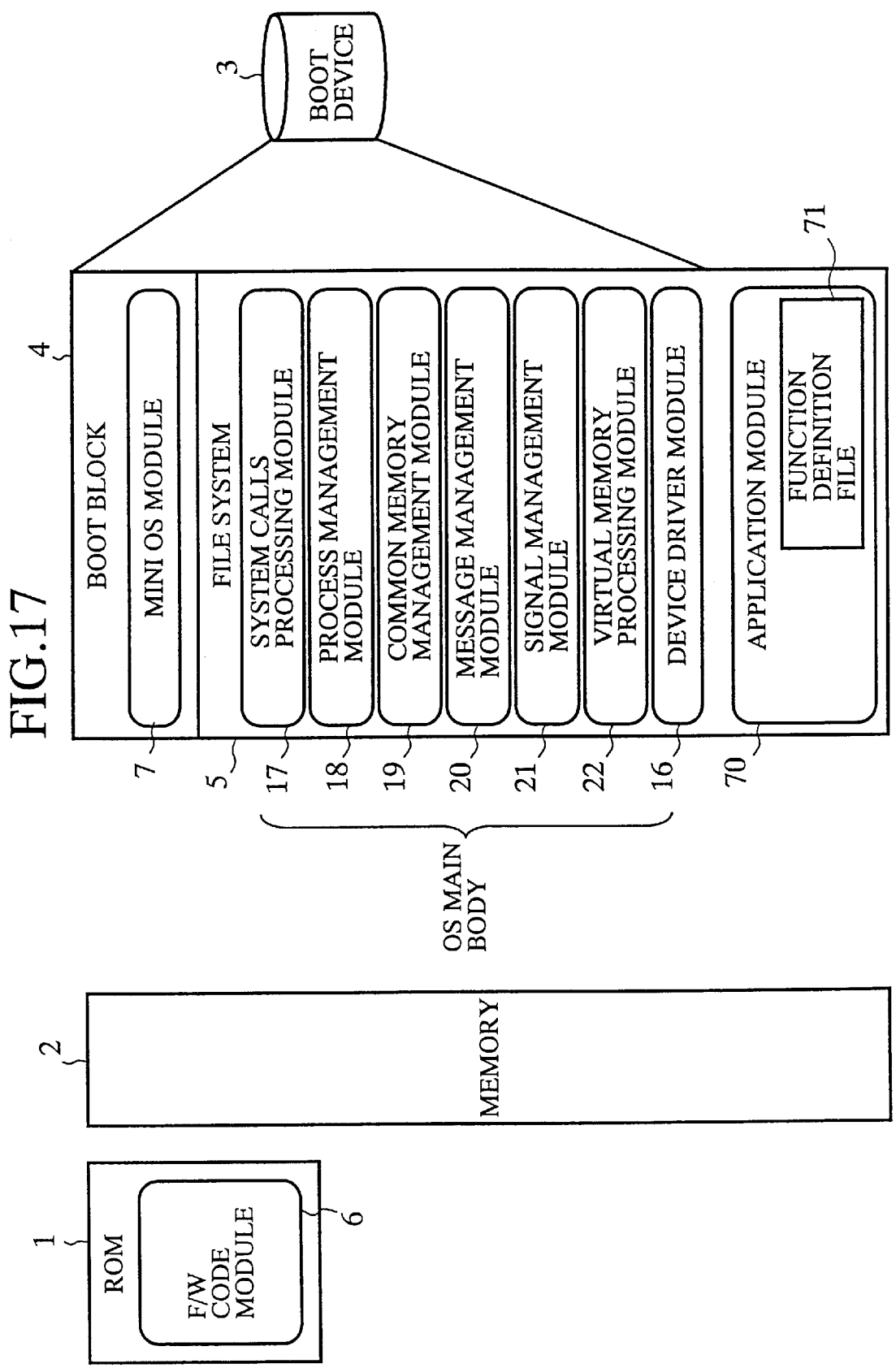
FIG. 17 is a block diagram showing the structure of an information processing apparatus according to a sixth embodiment of the present invention.

Referring next to FIG. 17, there is illustrated a block diagram showing the structure of an information processing apparatus according to a sixth embodiment of the present invention. In the figure, the same reference numerals as shown in FIG. 1 designate the same or like elements, and therefore the description of those elements will be omitted hereinafter. Like the OS of the second embodiment, the OS of the sixth embodiment is divided into a mini OS module 7 and a main body of the OS, and the main body is further divided into a plurality of functional modules, such as a system call processing module 17, a process management module 18, a common memory management module 19, a message management module 20, a signal management module 21, a virtual memory processing module 22, and a device driver module 16. The plurality of functional modules are separately stored as in a file system 5 of a boot device 3. In the file system 5, at least an application module 70 that can automatically start execution and run on the OS when booting up the information processing apparatus is also stored. The application module 70 includes a function definition file 71 for listing a minimum number of OS functional modules, such as some of the plurality of OS functional modules 16 to 22, required for the application module 70 to run on the OS.

Figure 18:
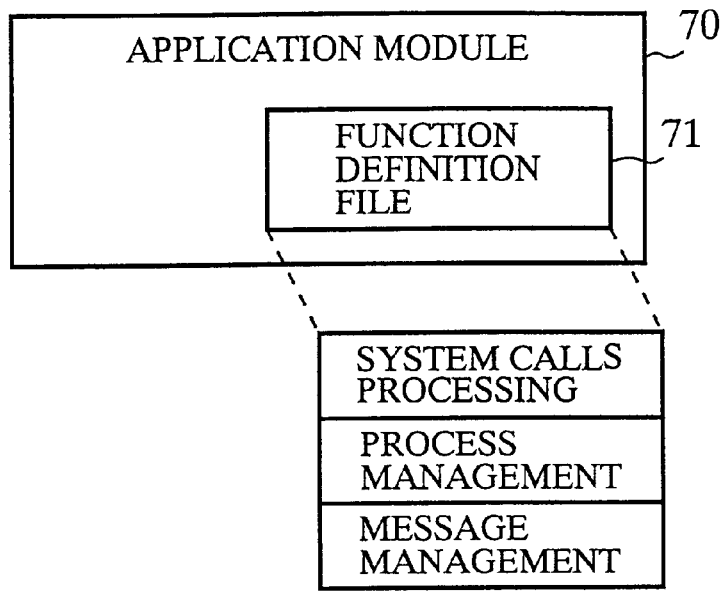
FIG. 18 is a diagram showing an application module of the information processing apparatus according to the sixth embodiment of the present invention.

Referring next to FIG. 18, there is illustrated a block diagram showing the structure of an example of a application module 70 of the information processing apparatus according to the sixth embodiment of the present invention. In the function definition file 71 of the application module 70 as shown in FIG. 18, the system call processing module 17, the process management module 18, and the message management module 20 are listed as an example.

Figure 19:
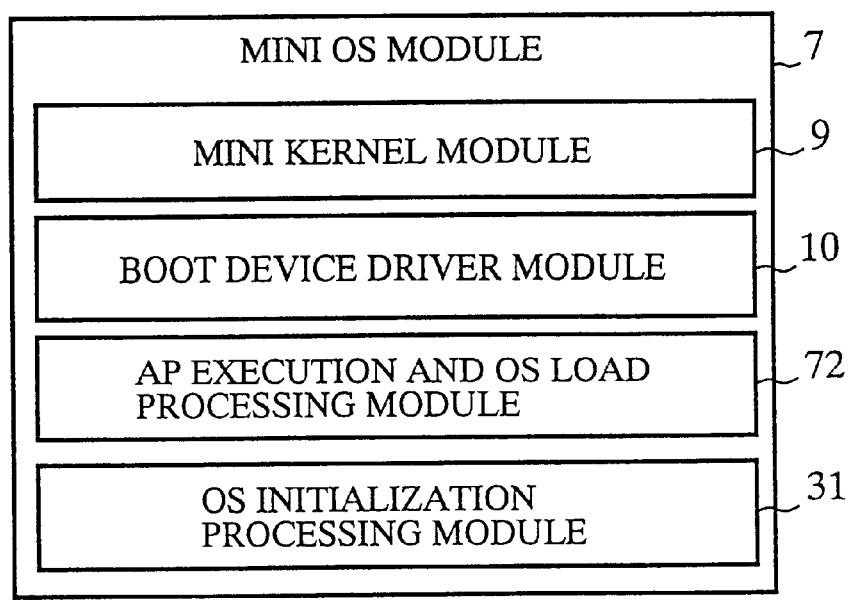
FIG. 19 is a diagram showing the structure of a mini OS module of the information processing apparatus according to the sixth embodiment of the present invention.

Referring next to FIG. 19, there is illustrated a block diagram showing the structure of the mini OS module 7 of the information processing apparatus according to the sixth embodiment of the present invention. The mini OS module 7 of the sixth embodiment is provided with a mini kernel module 9, a boot device driver module 10, an application (AP) execution and OS load processing module 72, and an OS initialization processing module 31.

Figure 20:
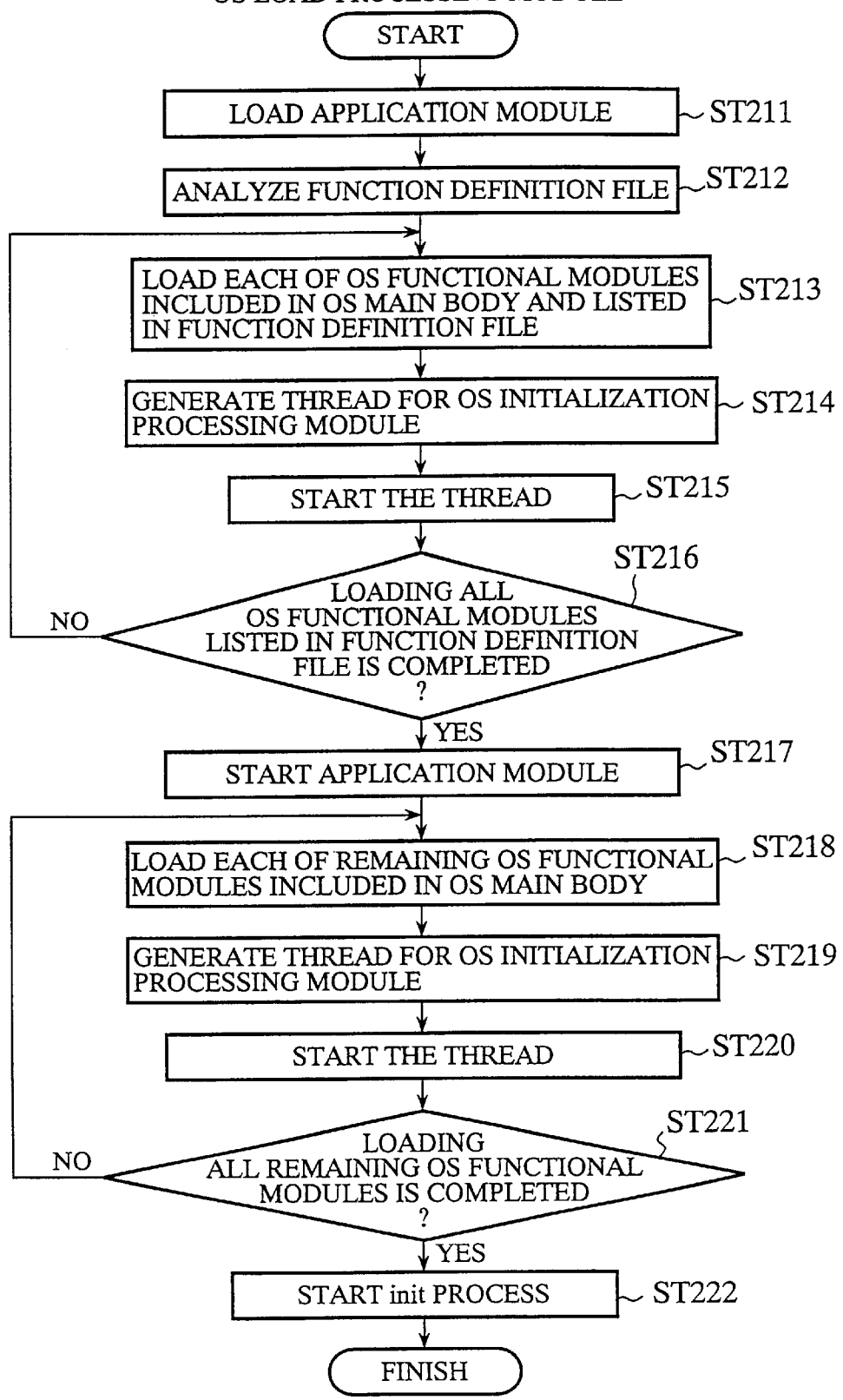
FIG. 20 is a flow chart showing operations of an application execution and OS load processing module of the information processing apparatus according to the sixth embodiment of the present invention.

Referring next to FIG. 20, there is illustrated a flow chart showing operations of the AP execution and OS load processing module 2 of the information processing apparatus according to the sixth embodiment of the present invention. One thread for the OS AP execution and load processing module 72 to which control from the mini OS module 7 has been transferred, in step ST211, loads the application module 70 from the file system 5 into the memory 2 and simultaneously loads the function definition file 71 into the memory 2. The AP execution and OS load processing module 72 then, in step ST212, ascertains what the minimum number of OS functional modules listed are, that is, it identifies the minimum number of OS functional modules listed in the function definition file 71, in the example of FIG. 19, the system call processing module 17, the process management module 18, and the message management module 20.

The AP execution and OS load processing module 72, in step ST213, loads one of the plurality of OS functional modules listed in the function definition file 71 into the memory 2. The AP execution and OS load processing module 72 then, in step ST214, generates a thread for the OS initialization processing module 31 and starts execution of the thread for the OS initialization processing module 31, in step ST215. After that, the OS initialization processing module 31 starts initialization of the loaded OS functional module. After that, the AP execution and OS load processing module 72 then, in step ST216, checks whether or not all the OS functional modules listed in the function definition file 71 has been loaded into the memory 2. If all the functional modules listed in the function definition file 71 have not been loaded into the memory 2 yet, the AP execution and OS load processing module 72 returns to step ST213 in which it continues to load the remaining functional modules listed in the function definition file 71. On the other hand, when the loading of all the OS functional modules listed in the function definition file 71 is completed, the AP execution and OS load processing module 72 starts the application module 70 loaded in step ST211 as a process, in step ST217. As a result, the application module 70 then starts execution.

The AP execution and OS load processing module 72 then, in step ST218, loads the remainder of the plurality of OS functional modules, which were not loaded into the memory in steps ST213 to ST216, in the example of FIG. 19, the common memory management module 19, the signal management module 21, the virtual memory processing module 22, and the device driver module 16, into the memory. The AP execution and OS load processing module 72 then, in step ST219, generates a thread for the OS initialization processing module 31 and starts execution of the thread, in step ST220. After that, the OS initialization processing module 31 starts initializing the OS functional module loaded in step ST218.

The AP execution and OS load processing module 72 then, in step ST221, checks whether or not the whole of the main body of the OS has been loaded, that is, whether or not all the functional modules 16 to 22 have been loaded into the memory 2. If all the functional modules 16 to 22 have not been loaded into the memory 2 yet, the AP execution and OS load processing module 72 returns to step ST218 in which it continues to load the remaining functional modules of the OS main body. On the other hand, when the loading of all the OS functional modules is completed, the AP execution and OS load processing module 72 loads the first process, called init, to be executed first from the file system 5 into the memory 2 and starts execution of the first process, in step ST222.

As previously mentioned, in accordance with the sixth embodiment of the present invention, the information processing apparatus can load and initialize a minimum number of OS functional modules required for at least an application to be automatically executed and run on the OS when booting up the information processing apparatus, first. Further, after placing the application into execution, the information processing apparatus loads and initializes the remaining OS functional modules. As a result, the time required to start up such an application upon booting up the information processing apparatus can be reduced. The sixth embodiment of the present invention also provides an advantage of being able to reduce the time required for booting up the information processing apparatus.

SEVENTH EMBODIMENT

Figure 21:
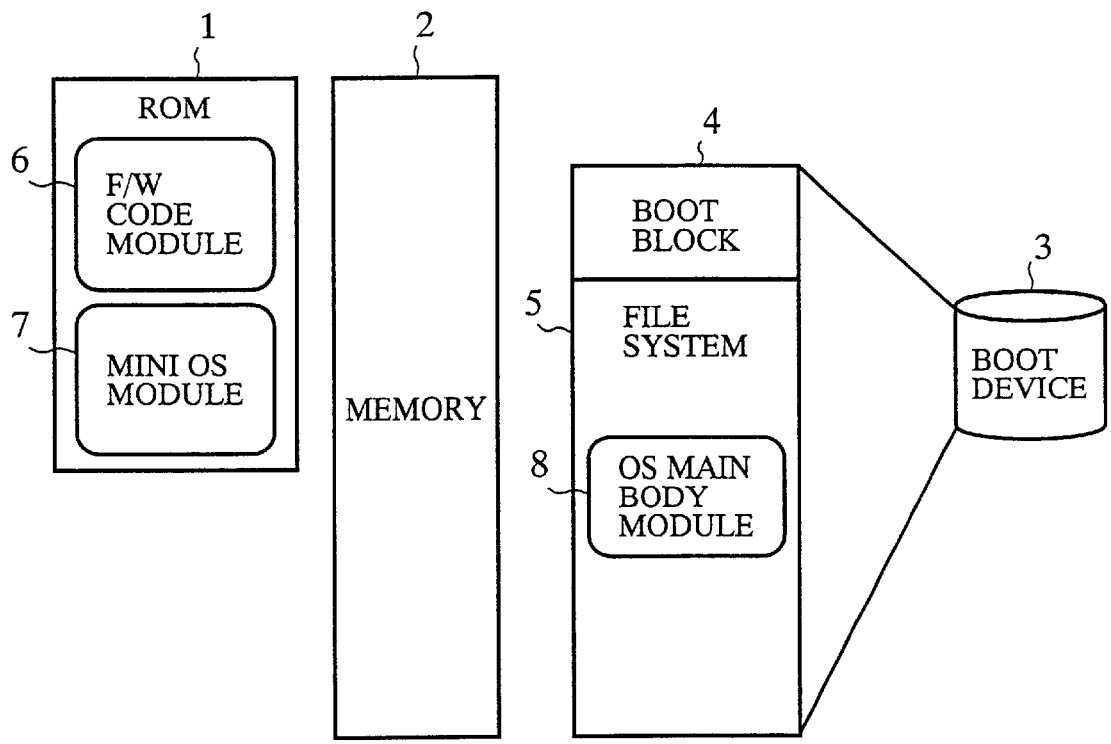
FIG. 21 is a block diagram showing the structure of an information processing apparatus according to a seventh embodiment of the present invention.
Figure 22:
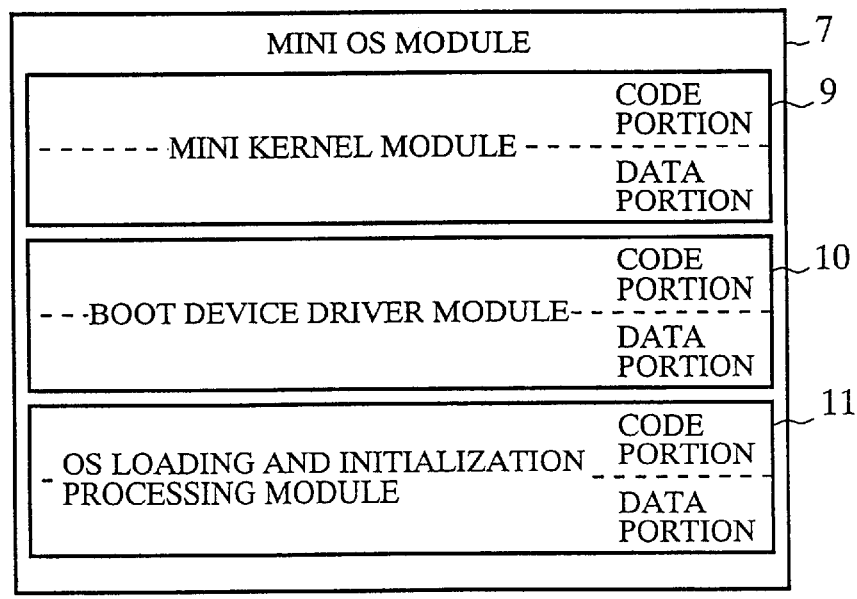
FIG. 22 is a diagram showing the structure of a mini OS module of the information processing apparatus according to the seventh embodiment of the present invention.

Referring next to FIG. 21, there is illustrated a block diagram showing the structure of an information processing apparatus according to a seventh embodiment of the present invention. FIG. 22 shows the structure of a mini OS module of the information processing apparatus according to the seventh embodiment of the present invention. In the figures, the same reference numerals as shown in FIGS. 1 and 2 designate the same or like elements, and therefore the description of those elements will be omitted hereinafter. A mini OS module 7 of the seventh embodiment is located in a ROM 1, unlike the mini OS module of the first embodiment. An OS main body module 8 having a structure as shown in FIG. 3 is stored in a file system 5 of a boot device 3. As shown in FIG. 22, the mini OS module 7 consists of a mini kernel module 9 having its code portion and its data portion, a boot device driver module 10 having its code portion and its data portion, and an OS loading and initialization processing module 11 having its code portion and its data portion. Those code portions can be executed directly on the ROM 1. Those data portions can be processed after they are loaded into memory 2.

Figure 23:
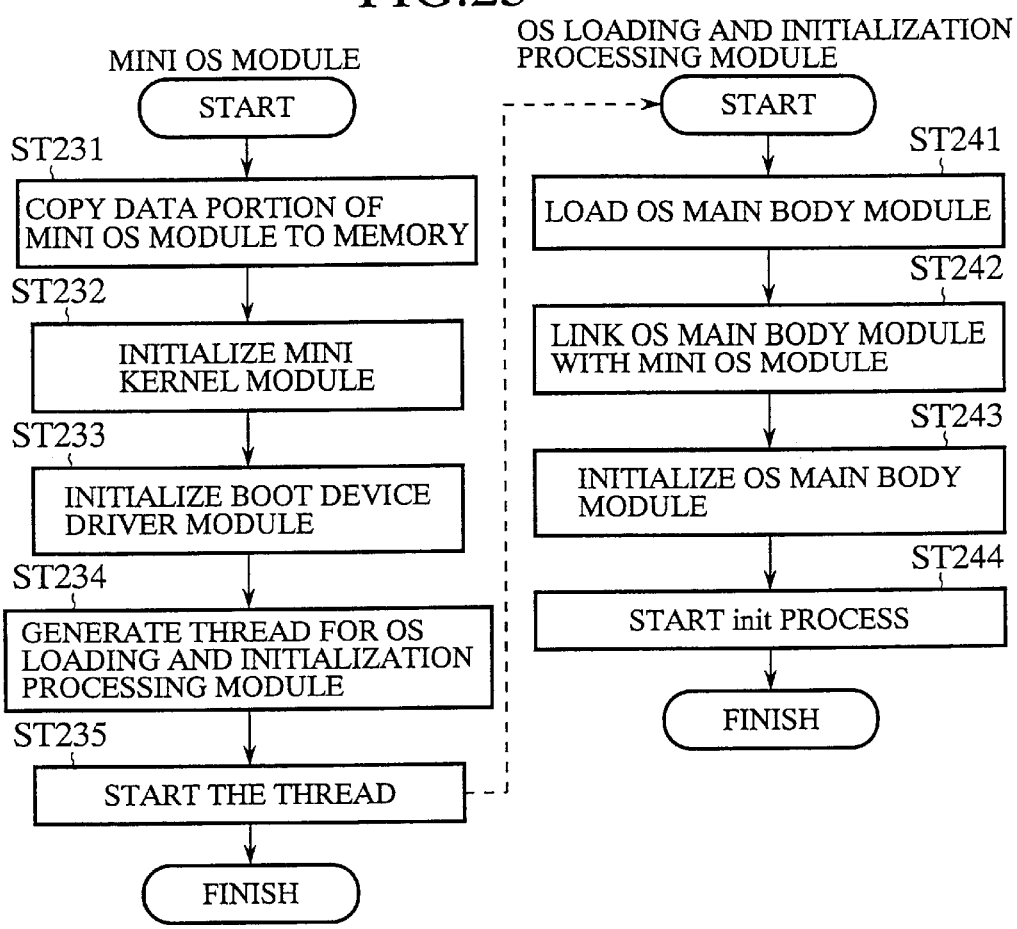
FIG. 23 is a flow chart showing operations of the mini OS module and an OS loading and initialization processing module of the information processing apparatus according to the seventh embodiment of the present invention.

Referring next to FIG. 23, there is illustrated a flow chart showing operations of the mini OS module 7 and the OS loading and initialization processing module 11 of the information processing apparatus according to the seventh embodiment of the present invention. After an F/W code module 6 has completed processing, it executes the mini OS module 7 directly on the ROM 1. The mini OS module 7 then, in step ST231, loads or copies the data portion of the mini OS module, i.e. the data portions of the mini kernel module 9, the boot device driver module 10, and the OS loading and initialization processing module 11, into the memory 2. After that, the mini OS module 7 executes initialization of the mini kernel module 9, in step ST232. Only the data portion of the mini kernel module 9 copied to the memory 2 can be used upon the initialization of the mini kernel module 9. Also, the data portion copied to the memory will be used in future processing. Next, the mini OS module 7, in step ST233, executes initialization of the boot device driver module 10. The mini OS module 7 then, in step ST234, generates a thread for the OS loading and initialization processing module 11 and, in step ST235, starts execution of the thread. As a result, the mini OS module 7 transfers control to the OS loading and initialization processing module 11.

Next, the OS loading and initialization processing module 11, in step ST241, loads the OS main body module 8 stored in the file system 5 of the boot device 3 into the memory 2. The OS loading and initialization processing module 11 then, instep ST242, links the OS main body module 8 loaded into the memory 2 with the mini OS module 7. The OS main body module 8 combines the code portion of the mini OS module 7 stored in the ROM 1 and the data portion of the mini OS module 7 loaded into the memory 2. The OS loading and initialization processing module 11 then, in Step ST243, executes initialization of the OS main body module 8. When the initialization of the OS main body module 8 is completed, the OS loading and initialization processing module 11, in step ST244, loads the first process, called init, to be executed first when booting up the information processing apparatus from the file system 5 into the memory 2 and starts execution of the first process. The OS loading and initialization processing module 11 thus completes the OS loading and initialization processing.

As previously mentioned, in accordance with the seventh embodiment of the present invention, the mini OS module 7 is located in the ROM 1 and only the data portion of the mini OS module 7 is loaded into the memory 2 and the code portion of the mini OS module 7 is executed directly on the ROM 1 upon booting up the information processing apparatus. Therefore, the process of copying the code portion of the mini OS module 7 to the memory can be eliminated. Accordingly, the seventh embodiment of the present invention provides an advantage of being able to further reduce the time required for booting up the information processing apparatus.

EIGHTH EMBODIMENT

Figure 24:
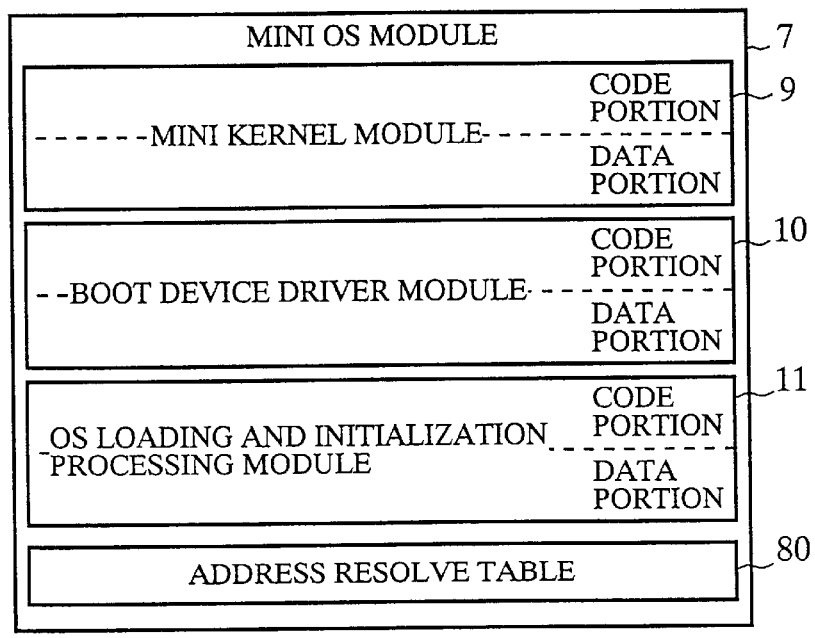
FIG. 24 is a diagram showing the structure of a mini OS module of an information processing apparatus according to an eighth embodiment of the present invention.

Referring next to FIG. 24, there is illustrated a block diagram showing the structure of a mini OS module of an information processing apparatus according to an eighth embodiment of the present invention. In the figure, the same reference numerals as shown in FIG. 22 designate the same or like elements, and therefore the description of those elements will be omitted hereinafter. A mini OS module 7 of the eighth embodiment is located in a ROM 1, like the mini OS module of the seventh embodiment as shown in FIG. 21. An OS main body module 8 of the eighth embodiment is located in a file system 5 of a boot device 3, like the OS main body of the seventh embodiment as shown in FIG. 21. As shown in FIG. 24, the mini OS module 7 includes an address resolve table 80 in addition to a mini kernel module 9 having its code portion and its data portion, a boot device driver module 10 having its code portion and its data portion, and an OS loading and initialization processing module 11 having its code portion and its data portion. In the address resolve table 80, symbols defined in the mini kernel module 9, the boot device driver module 80, and the OS loading and initialization processing module 11, and symbols needed by the OS main body module 8 are described. The mini OS module 7 and the OS main body module 8 have access to each other to access each other's functions and data by using the address resolve table 80.

Figure 25:
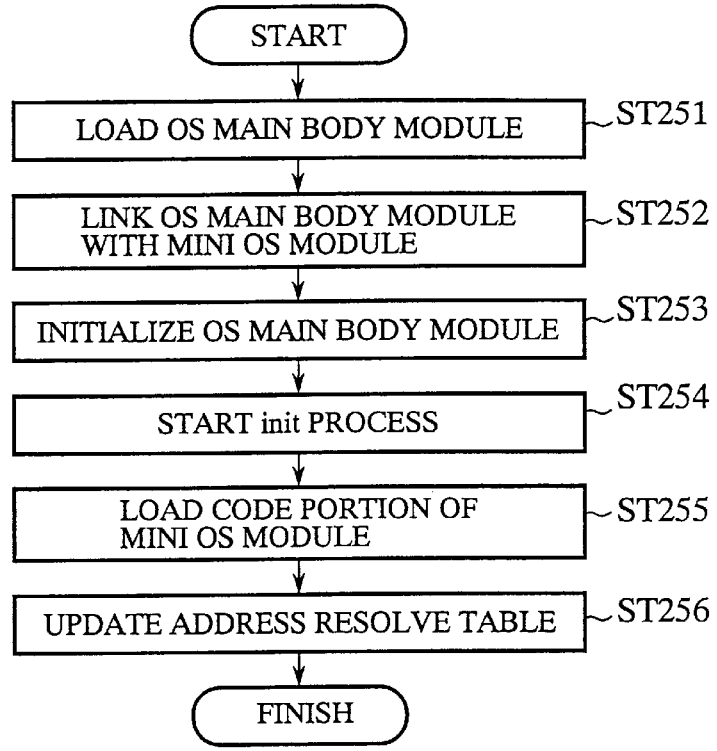
FIG. 25 is a flow chart showing operations of an OS loading and initialization processing module of the information processing apparatus according to the eighth embodiment of the present invention.

Referring next to FIG. 25, there is illustrated a flow chart showing operations of the OS loading and initialization processing module 11 of the information processing apparatus according to the eighth embodiment of the present invention. The OS loading and initialization processing module 11 which has been started as a thread, in step ST251, loads the OS main body module 8 from the file system 5 of the boot device 3 into the memory 2. The OS loading and initialization processing module 11 then, in step ST252, links the OS main body module 8 loaded into the memory 2 with the mini OS module 7. The linkage is carried out by way of the address resolve table 80. In other words, when the OS main body module 8 needs the code or data of the mini OS module 7, it has to refer to a corresponding entry in the address resolve table 80 so as to call a desired function or access desired data.

The OS loading and initialization processing module 11 then, in step ST253, executes initialization of the OS main body module 8. When the initialization of the OS main body module 8 is completed, the OS loading and initialization processing module 11, in step ST254, loads the first process, called init, to be executed first from the file system 5 into the memory 2 and starts execution of the init process. Any application program is thus made executable. When the OS loading and initialization processing module 11 completes the OS loading and initialization processing, it loads the code portion of the mini OS module 7 into the memory 2, instep ST255. The OS loading and initialization processing module 11 then, in step ST256, updates the contents of the address resolve table 80. This is because the contents of one entry of the address resolve table 80 specifying the location of the code portion of the mini OS module 7 (i.e. the start address specifying the memory location in the ROM 1) have to be changed to the start address specifying the memory location of the code portion loaded in the memory 2). As a result, the OS main body module 8 has access to the code portion of the mini OS module 7 stored in the memory 2 rather than in the ROM 1.

As previously mentioned, in accordance with the eighth embodiment of the present invention, the code portion of the mini OS module 7 is loaded into the memory 2 after starting the first process, called init, and the contents of the address resolve table 80 is updated so that the OS main body module 8 has access to the code portion-of the mini OS module 7 loaded into the memory 2. Therefore, future execution of the mini OS module 7 can be done by reading the code portion from the memory 2. Accordingly, the eighth embodiment of the present invention provides an advantage of being able to reduce the time required to start execution of at least an application to be automatically executed upon booting up the information processing apparatus as well as to eliminate delay to be caused when executing the OS code directly from the ROM 1.

NINTH EMBODIMENT

Figure 26:
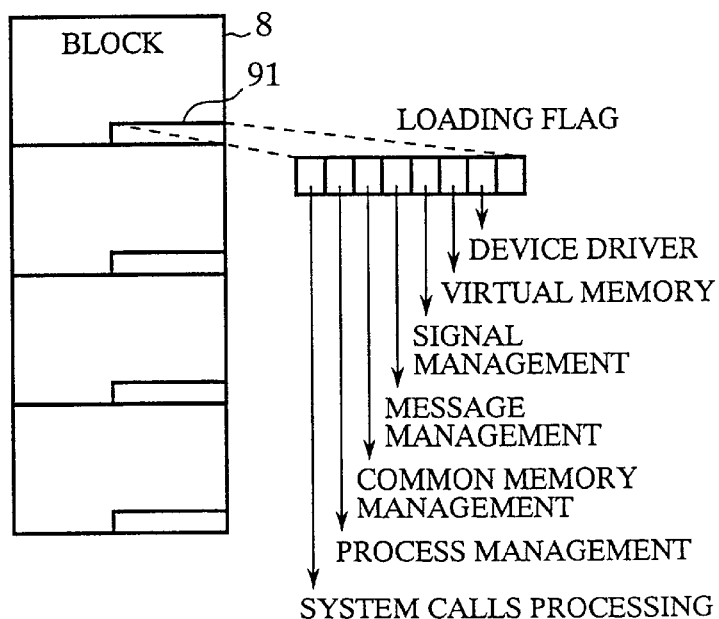
FIG. 26 is a diagram showing the file structure of an OS main body module of an information processing apparatus according to a ninth embodiment of the present invention.

Referring next to FIG. 26, there is illustrated a block diagram showing the structure of an OS main body module of an information processing apparatus according to a ninth embodiment of the present invention. The information processing apparatus of the ninth embodiment can have the same structure as that of the aforementioned first embodiment as shown in FIGS. 1 to 3. An OS main body module 8, into which a kernel module 15 and a device driver module 16 are incorporated, as shown in FIG. 3, can be divided into a plurality of blocks of arbitrary record size such as 4K bytes or 16K bytes, each of which includes a loading flag 91 at the end thereof. The loading flag 91 of each block has a plurality of bits corresponding to a plurality of functional modules within the OS main body module 8, such as a system call processing module 17, a process management module 18, a common memory management module 19, a message management module 20, a signal management module 21, a virtual memory processing module 22, and a device driver module 16, respectively. A block including the end of one functional module includes a loading flag 91, a corresponding bit of which is set to one. Therefore, if one bit of the loading flag 91 of a just-loaded block is in ON state, i.e. state 1, it is determined that a corresponding functional module has just been loaded into a memory 2, and the initialization of the functional module is then carried out. In contrast, when all bits of the loading flag 91 of the just-loaded block are in OFF state, i.e. state 0, the next block will simply be loaded into the memory 2 without generating and starting execution of a thread for initialization of the functional module being loaded into the memory.

Figure 27:
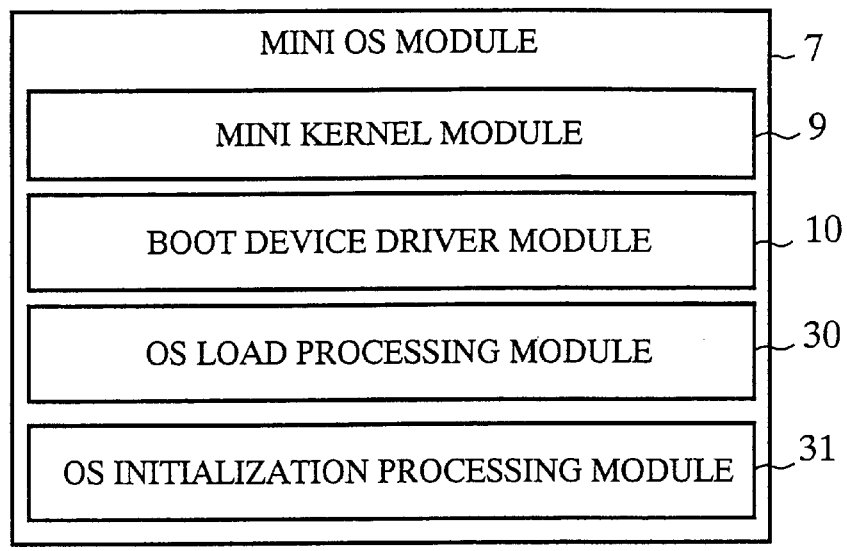
FIG. 27 is a diagram showing the structure of a mini OS module of the information processing apparatus according to the ninth embodiment of the present invention.

Referring next to FIG. 27, there is illustrated a block diagram showing the structure of the mini OS module of the information processing apparatus according to the ninth embodiment of the present invention. Like the mini OS module 7 of the second embodiment, the mini OS module 7 of the ninth embodiment is provided with a mini kernel module 9, a boot device driver module 10, an OS load processing module 30, and an OS initialization processing module 31, as shown in FIG. 27.

Figure 28:
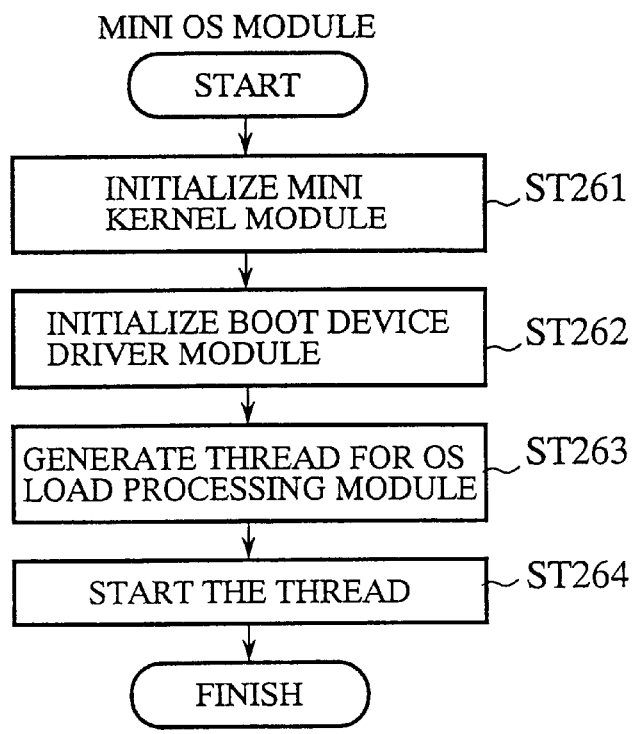
FIG. 28 is a flow chart showing operations of the mini OS module of the information processing apparatus according to the ninth embodiment of the present invention.

Referring next to FIG. 28, there is illustrated a flow chart showing operations of the mini OS module 7 of the information processing apparatus according to the ninth embodiment of the present invention. An F/W code module 6 loads the mini OS module 7 into a memory 2 and transfers control to the mini OS module 7. The mini OS module 7 then, in step ST261, executes initialization of the mini kernel module 9. The mini OS module 7 in turn, in step ST262, executes initialization of the boot device driver module 10. After that, the mini OS module 7, in step ST263, generates a thread for the OS load processing module 30. The mini OS module 7 then, in step ST264, starts execution of the thread for the OS load processing module 30. As a result, the OS load processing module 30 starts execution.

Figure 29:
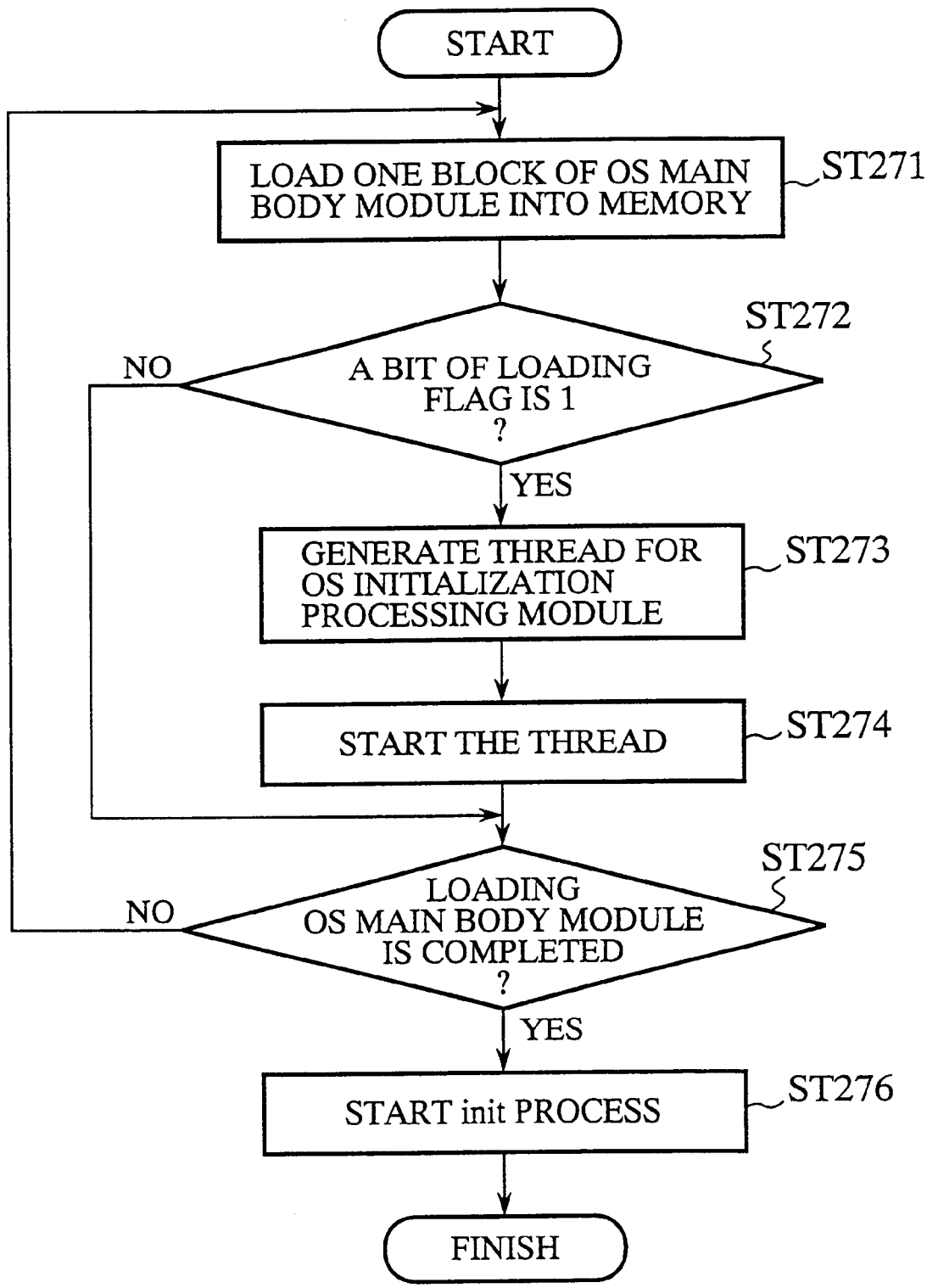
FIG. 29 is a flow chart showing operations of an OS load processing module of the information processing apparatus according to the ninth embodiment of the present invention.

Referring next to FIG. 29, there is illustrated a flow chart showing operations of the OS load processing module 30 of the information processing apparatus according to the third embodiment of the present invention. The OS load processing module 30, in step ST271, starts loading one block (the first block for the first time) of the OS main body module 8 stored in the file system 5 of the boot device 3 into the memory 2. The OS load processing module 30 then, in step ST272, refers to the loading flag 91 in the loaded block and then determines whether or not each of the plurality of bits of the loading flag is 1. If one of the plurality of bits is 1, the OS load processing module 30, in step ST273, generates a thread for the OS initialization processing module 31 and, in step ST254, starts execution of the thread. The OS initialization processing module 31 thus starts initializing the loaded functional module. After that, the OS load processing module 30 advances to step ST275. On the other hand, when the OS load processing module 3 determines that all the bits of the loading flag 91 are set to 0, it also advances to step ST275.

In step ST275, the OS load processing module 3 checks whether or not all blocks of the OS main body module 8 have been loaded into the memory 2. If all blocks of the OS main body module have not been loaded into the memory 2 yet, the OS load processing module 30 returns to step ST271 in which it loads the next block of the OS main body module 8 into the memory 2. On the other hand, when the loading of all blocks of the OS main body module 8 is completed, the OS load processing module 30 loads the first process, called init, to be executed first from the file system 5 into the memory 2 and starts execution of the first process, in step ST276. The load processing is thus completed.

Figure 30:
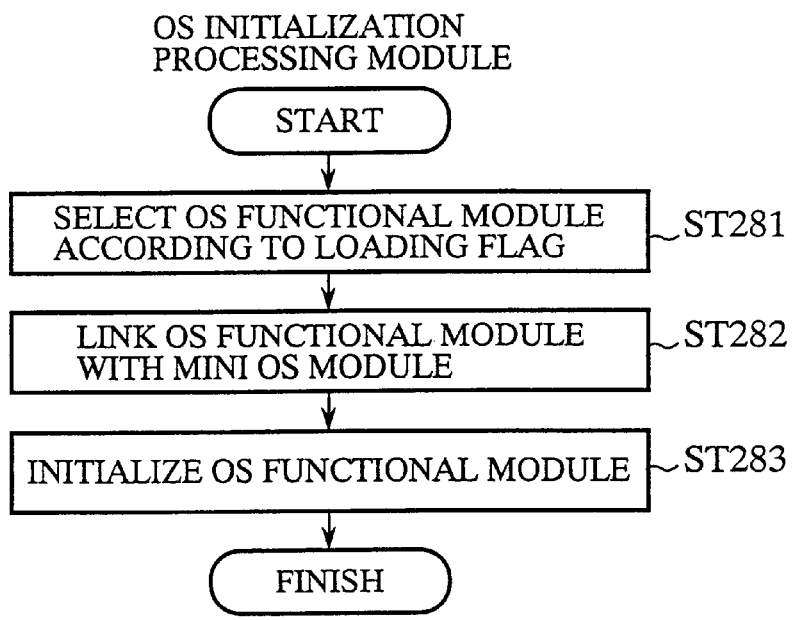
FIG. 30 is a flow chart showing operations of an OS initialization processing module of the information processing apparatus according to the ninth embodiment of the present invention.

Referring next to FIG. 30, there is illustrated a flow diagram showing operations of the OS initialization processing module 31 of the information processing apparatus according to the ninth embodiment of the present invention. When the OS initialization processing module 31 is started as a thread by the mini OS module 7, it, in step ST281, refers to the loading flag 91 of a loaded block of the OS main body module 8 so as to determine which bit is set to one. The OS initialization processing module 8 then selects one functional module indicated by a bit set to one as the target functional module to be initialized from among the plurality of functional modules: the system call processing module 17, the process management module 18, the common memory management module 19, the message management module 20, the signal management module 21, the virtual memory processing module 22, and the device driver module 16. Next, the OS initialization processing module 31, in step ST282, links the loaded functional module with the mini OS module 7. The OS initialization processing module 31 then, instep ST283, initializes the loaded functional module.

As previously mentioned, in accordance with the ninth embodiment of the present invention, the OS main body module 8 of the information processing apparatus provides the loading flag 91 for each of a plurality of blocks into which the OS main body module 8 is divided. In addition, since a block including the end of one functional module includes a loading flag 91, a corresponding bit of which is set to one, the initialization of the functional module, can be done after the loading of the functional module is completed. As a result, the OS load processing and the OS initialization processing can be executed in parallel. Accordingly, the ninth embodiment of the present invention provides an advantage of being able to reduce the time required for booting up the information processing apparatus.

TENTH EMBODIMENT

Figure 31:
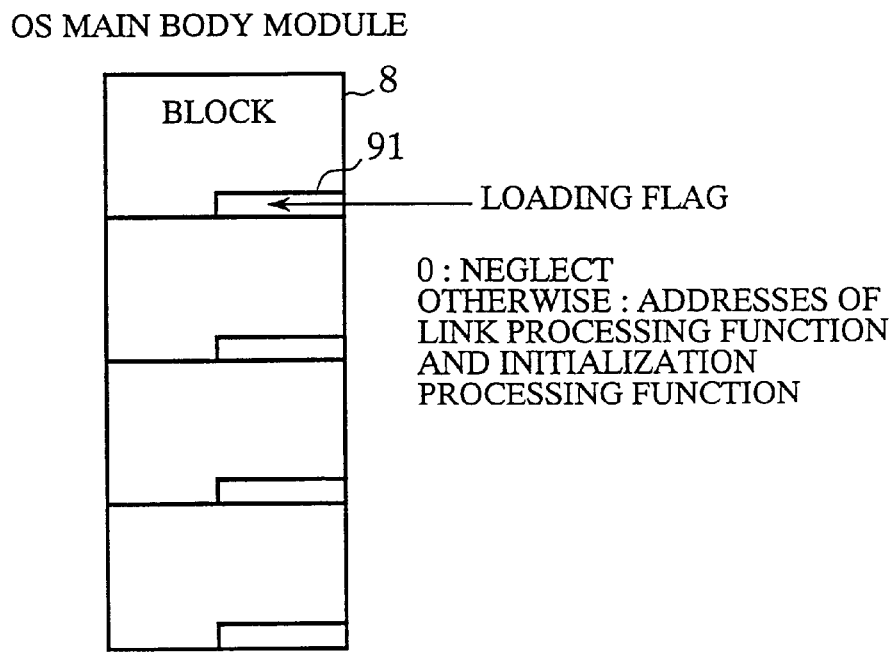
FIG. 31 is a diagram showing the structure of an OS main body module of an information processing apparatus according to a tenth embodiment of the present invention.

Referring next to FIG. 31, there is illustrated a block diagram showing the structure of an OS main body module of an information processing apparatus according to a tenth embodiment of the present invention. In the figure, the same reference numerals as shown in FIG. 26 designate the same or like elements, and therefore the description of those elements will be omitted hereinafter. Like the ninth embodiment, the information processing apparatus of the tenth embodiment has the same structure as that of the aforementioned first embodiment as shown in FIG. 1. In other words, the OS is divided into a mini OS nodule 7 stored in a boot block 4 of a boot device 3 and an OS main body module 8 stored in a file system 5 of the boot device 3. Like the OS main body module of the ninth embodiment, the OS main body module 8 is divided into a plurality of blocks of arbitrary record block such as 4K bytes or 16K bytes, each of which includes a loading flag 91 at the end thereof. A block including the end of one functional module includes a loading flag 91 into which the address of a linkage processing function of linking the functional module with the mini OS module and the address of an initialization function of initializing the functional module are written. Therefore, if the loading flag 91 of a just-loaded block has a value other than zero, it is determined that a corresponding functional module has just been loaded into a memory 2, and the linkage between the loaded functional module and the mini OS module and the initialization of the functional module are then carried out. In contrast, when the loading flag 91 of the just-loaded block is set to zero, the next block will simply be loaded into the memory 2 without generating and starting execution of a thread for initialization of the functional module being loaded into the memory.

Like the ninth embodiment mentioned above, an F/W code module loads the mini OS module 7 into the memory 2 and transfers control to the mini OS module 7. The mini OS module 7 then executes initialization of a mini kernel module 9 and executes initialization of a boot device driver module 10. After that, the mini OS module 7 generates a thread for an OS load processing module 30 and starts execution of the thread for the OS load processing module 30. As a result, the OS load processing module 30 is started.

Figure 32:
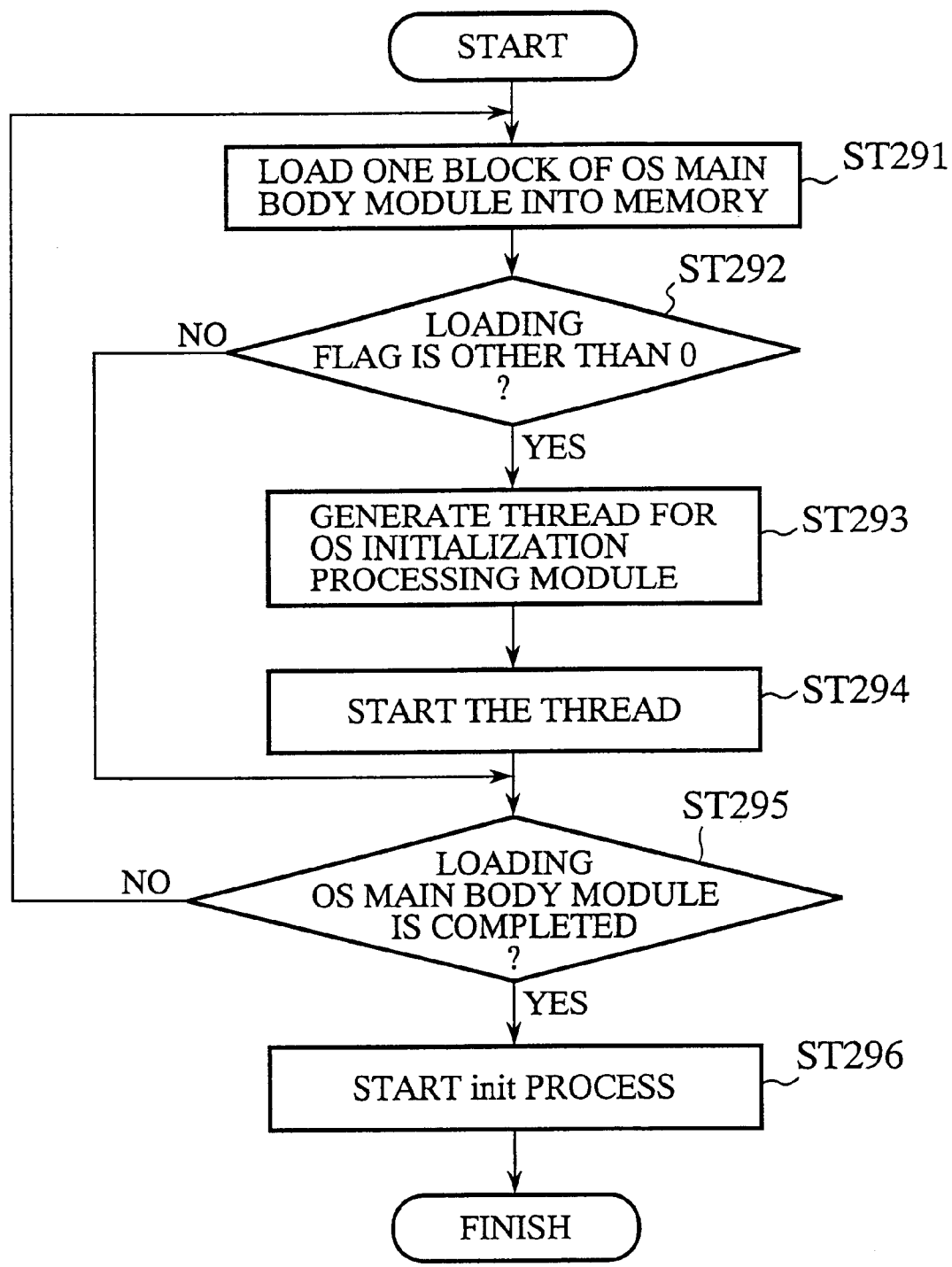
FIG. 32 is a flow chart showing operations of an OS load processing module of the information processing apparatus according to the tenth embodiment of the present invention.

Referring next to FIG. 32, there is illustrated a flow chart showing operations of the OS load processing module 30 of the information processing apparatus according to the tenth embodiment of the present invention. When the OS load processing module 30 is started as a thread, it, in step ST291, loads the first block of the OS main body module 8 stored in the file system 5 of the boot device 3 into the memory 2. The OS load processing module 30 then, in step ST292, determines whether or not the loading flag 91 is 0. Unless the loading flag 91 is 0, the OS load processing module 30, in step ST293, generates a thread for the OS initialization processing module 31 and, in step ST294, starts execution of the thread. Thus the OS initialization processing module 31 can start initializing the loaded functional module. The OS load processing module 30 then advances to step ST295. On the other hand, when the loading flag 91 is 0 in performing step ST292, the OS load processing module 30 also advances to step ST295.

In step ST295, the OS load processing module 30 checks whether or not the loading of the OS main body module 8 is completed. Unless the loading of the OS main body module 8 is completed, the OS load processing module 30 returns to step ST291 in which it loads the next block of the OS main body module 8 into the memory 2. On the other hand, when the loading of all blocks of the OS main body module 8 is completed, the OS load processing module 30 loads the first process, called init, to be executed first from the file system 5 into the memory 2 and starts execution of the first process, in step ST296. The load processing is thus completed.

Figure 33:
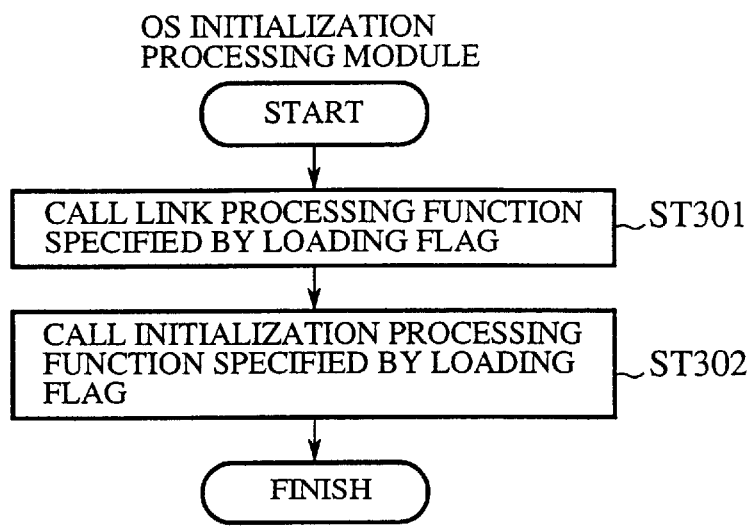
FIG. 33 is a flow chart showing operations of an OS initialization processing module of the information processing apparatus according to the tenth embodiment of the present invention.

Referring next to FIG. 33, there is illustrated a flow diagram showing operations of the OS initialization processing module of the information processing apparatus according to the tenth embodiment of the present invention. When the OS initialization processing module 31 is started as a thread by the OS load processing module 30, it, in step ST301, calls a linkage processing function by referring to the address of the linkage processing function stored in the loading flag 91 of the just-loaded block. The linkage processing function then links the functional module which has just been loaded into the memory by the OS load processing module 30 with the mini OS module 7. The OS initialization processing module 31 then, in step ST302, calls an initialization processing function by referring to the address of the initialization processing function stored in the loading flag 91 of the just-loaded block. The initialization processing function then initializes the loaded functional module.

As previously mentioned, in accordance with the tenth embodiment of the present invention, in the loading flag 91 of a block including the end of a functional module that is an part of the OS main body module, the addresses of a linkage processing function and an initialization processing function, respectively used for linking the functional module with the mini OS module 7 and for initializing the functional module are stored. As a result, the OS initialization processing module does not need to determine which functional mode has just been loaded into memory. Accordingly, the tenth embodiment of the present invention provides an advantage of being able to further reduce the time required for booting up the information processing apparatus.

ELEVENTH EMBODIMENT

Figure 34:
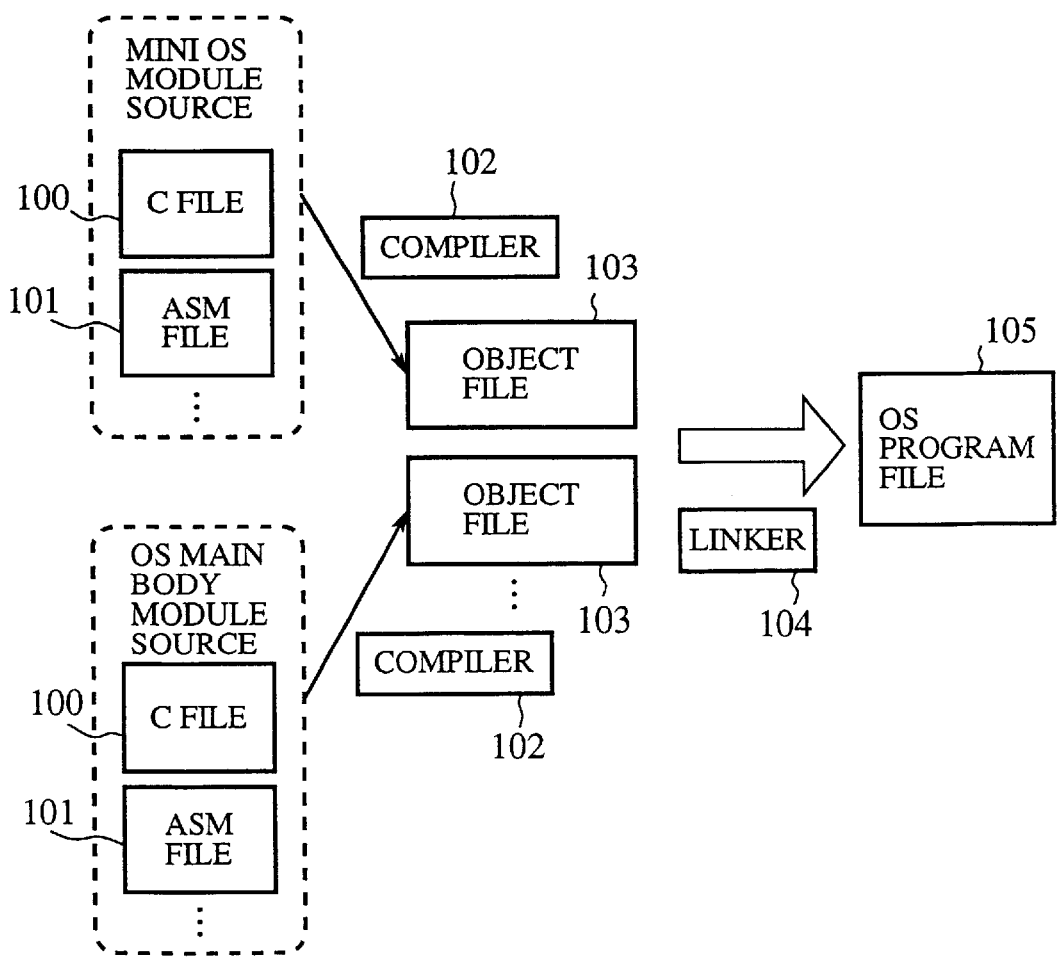
FIG. 34 is a diagram showing a process for generating an OS program file from program source files in an information processing apparatus according to an eleventh embodiment of the present invention.

Referring next to FIG. 34, there is illustrated a diagram showing a process of creating an operating system (OS) program file from program source files in an information processing apparatus according to an eleventh embodiment of the present invention. The information processing apparatus according to the eleventh embodiment can have the same structure as of the aforementioned first embodiment as shown in FIG. 1.

Each of the source files of a mini OS module 7 and an OS main body module 8 of FIG. 1 consists of a C file 100 written in the C language and an ASM file 101 written in the assembler language. A compiler 102 converts each of the source files into an equivalent object file 103 written in machine language. A linkage editor or linker 104 statically combines the functions and data of the object files 103 generated by the compiler 102 into one OS program file 105.

Figure 35:
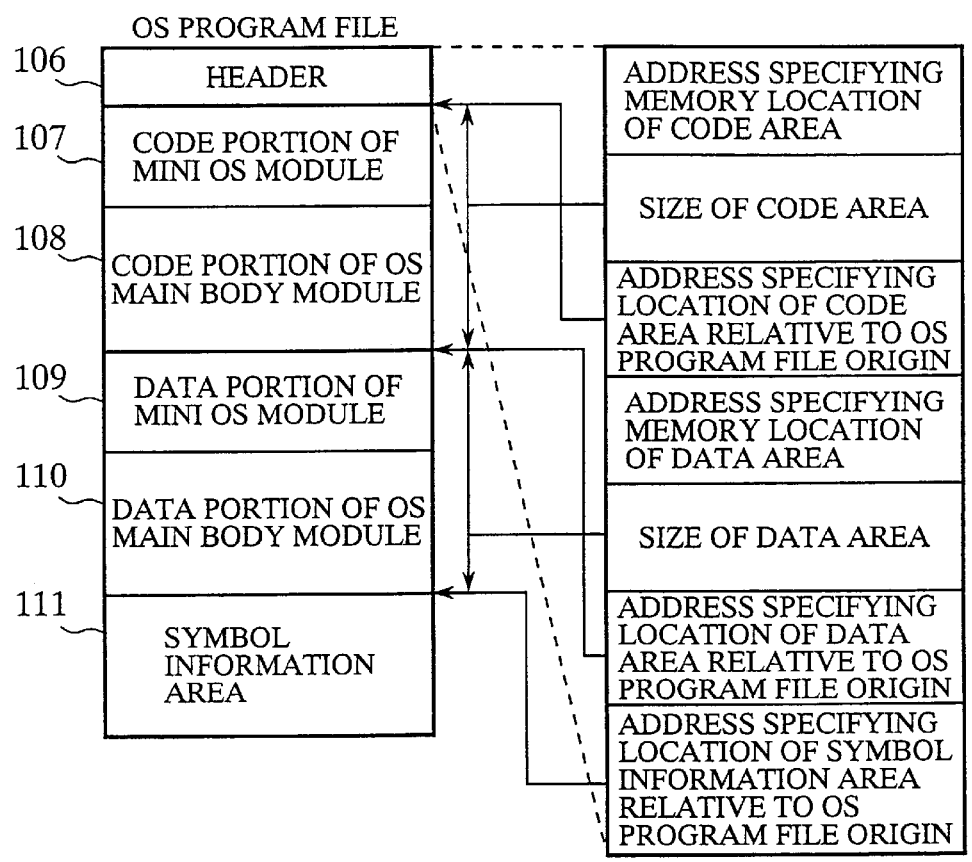
FIG. 35 is a diagram showing the structure of the OS program file in the information processing apparatus according to the eleventh embodiment of the present invention.

Referring next to FIG. 35, there is illustrated a diagram showing the structure of the OS program file 105 generated by the information processing apparatus according to the eleventh embodiment of the present invention. The OS program file 105 created by the linker 104 includes a header 104 at the top thereof. The OS program file 105 includes a code area comprised of a code portion 107 of the mini OS module and a code portion 108 of the OS main body module at the back of the header 106, and further includes a data area comprised of a data portion 109 of the mini OS module and a, data portion 110 of the OS main body module. The OS program file 105 further includes a symbol information area 111 including the values of symbols included in the code and data areas of the OS program file at the bottom thereof.

The header 104 includes a code address entry with an absolute address specifying the location of a memory 2 where the top of the code area of the OS program file is to be loaded, a code size entry with the size of the code area, a relative code address entry with a relative address relative to the origin of the OS program file, specifying the location of the top of the code area within the OS program file, a data address entry with an absolute address specifying the location of the memory 2 where the top of the data area of the OS program file is to be loaded, a data size entry with the size of the data area, a relative data address entry with a relative address relative to the origin of the OS program file, specifying the location of the top of the data area within the OS program file, and a symbol information area address entry with a relative address relative to the origin of the OS program file, specifying the location of the top of the symbol information area 111 within the OS program file. When booting up the information processing apparatus, the contents of the header 106 can be used to search through the OS program file 105 for the code and data areas and to determine where to load those areas into the memory 2 and what memory size they need, which will be described later.

Figure 36:
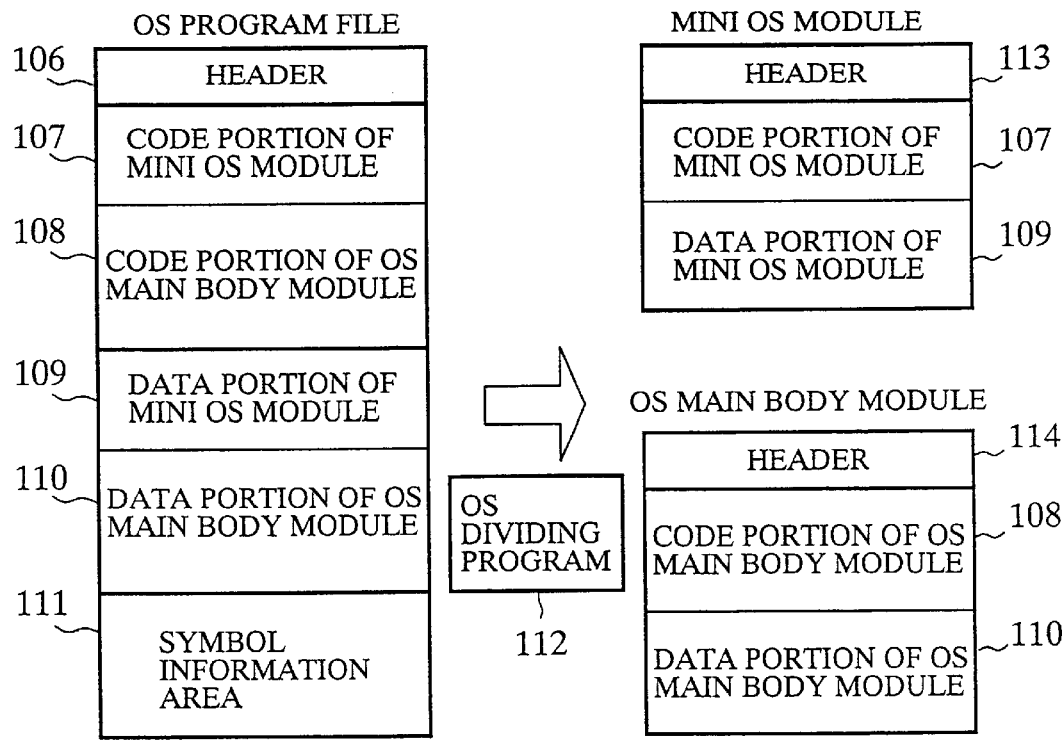
FIG. 36 is a diagram showing a process for dividing the OS program file into a mini OS module and an OS main body module in the information processing apparatus according to the eleventh embodiment of the present invention.

Referring next to FIG. 36, there is illustrated a diagram showing a process of dividing the OS program file into the mini OS module and the OS main body module in the information processing apparatus according to the eleventh embodiment of the present invention. An operating system (OS) dividing program 112 can divide the OS program file 105 created by the linker 104 into the mini OS module 7 and the OS main body module 8. The OS dividing program 112 extracts the code and data portion 107 and 109 of the mini OS module from the OS program file 105 and then writes them into the mini OS module 7.

The OS dividing program 112 stores information associated with the code and data portions 107 and 109 of the mini OS module into a header 113 of the mini OS module 7. To be more specific, the OS dividing program 112 writes the absolute address specifying the memory location where the top of the code portion 107 of the mini OS module is to be loaded into a code address entry of the header 113, the size of the code portion 107 of the mini OS module into a code size entry of the header 113 and the relative address of the code portion 107 of the mini OS module that is relative to the origin of the mini OS module 7 into a relative code address entry of the header 113. Information on -the data portion 109 of the mini OS module is also written into the header 113 by the OS dividing program 112. Since information of the symbol information area 111 is not needed when booting up the information processing apparatus, it is not necessary to link it to the mini OS module 7. The OS dividing program 112 generates the OS main body module 8 in a similar way.

Figure 37:
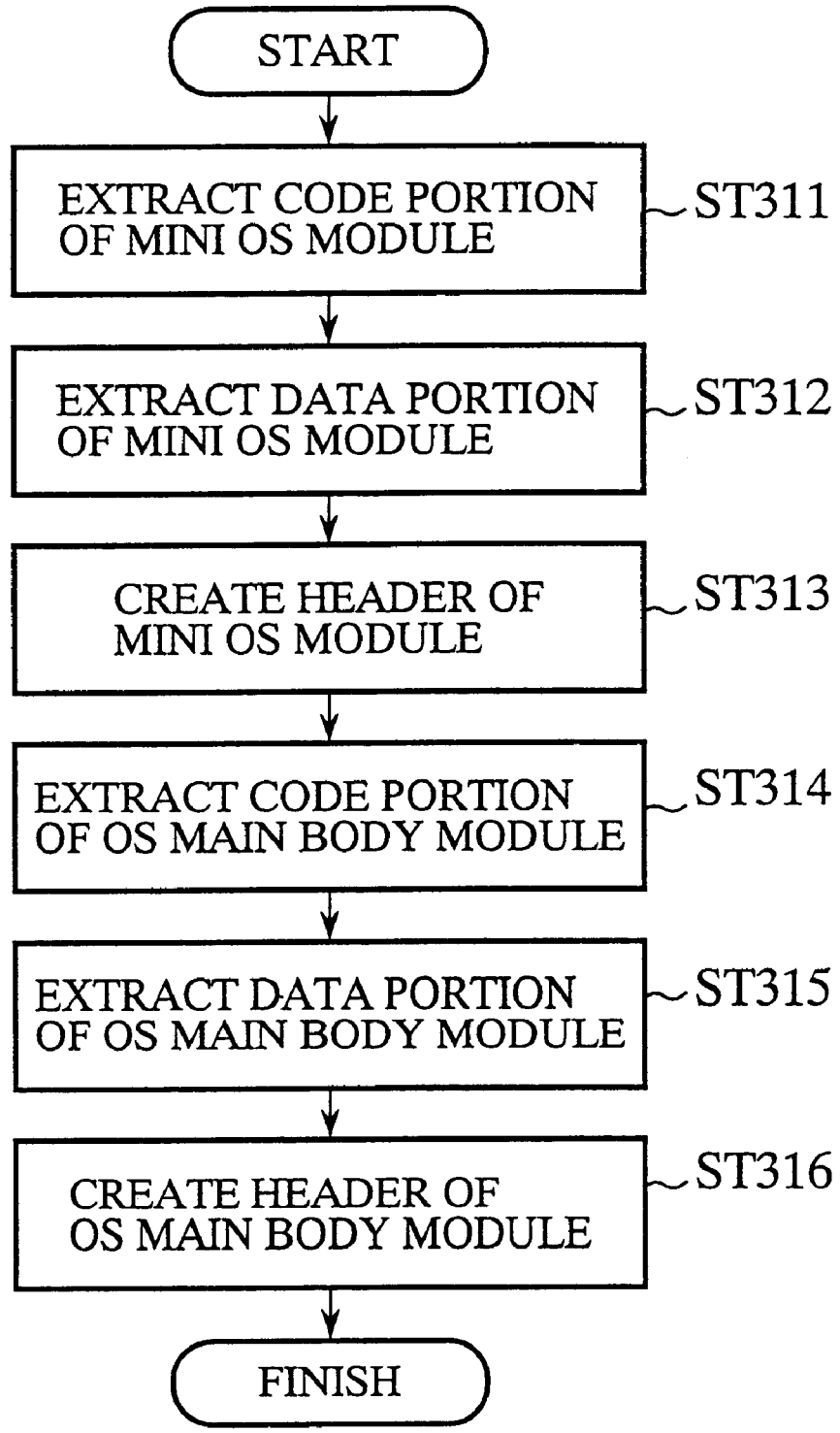
FIG. 37 is a flow chart showing operations of an OS dividing unit of the information processing apparatus according to the eleventh embodiment of the present invention.

Referring next to FIG. 37, there is illustrated a flow chart showing operations of the OS dividing program of the information processing apparatus according to the eleventh embodiment of the present invention. When the OS diving module 112 is started, it, in step ST311, extracts the code portion 107 of the mini OS module from the OS program file 105 and then writes the extracted code into the mini OS module 7. The OS dividing program 112 can determine-the location of the code portion 107 of the mini OS module from the relative code address specifying the location of the code area within the OS program file, which is stored in the header 106. The size of the code portion 107 of the mini OS module can be calculated by searching through the symbol information area 111 for the symbol of a function located at the top of the code portion 108 of the OS main body module, and by subtracting the absolute address of the code area, i.e. the address of the memory location of the top of the code portion 107 of the mini OS module from the value of the symbol searched for, indicating the address of the memory location where the top of the code portion 108 of the OS main body module is to be loaded.

Next, the OS dividing program 112, instep ST312, extracts the data portion 109 of the mini OS module from the OS program file 105 and then writes the extracted data into the mini OS module 7. The OS dividing program 112 can determine the location of the data portion 109 of the mini OS module from the relative data address specifying the location of the data area within the OS program file, which is stored in the header 106. The size of the data portion 109 of the mini OS module can be calculated by searching through the symbol information area 111 for the symbol of a variable located at the top of the data portion 110 of the OS main body module, and by subtracting the absolute address of the data area., i.e. the address of the memory location of the top of the data portion 109 of the mini OS module from the value of the symbol searched for, indicating the address of the memory location where the top of the data portion 110 of the OS main body module is to be loaded. The OS dividing program 112 then, in step ST313, generates the header 113 for the mini OS module 7. The absolute address of the code area stored in the header 106 of the OS program file 105 is written into the code address entry of the header 113 for storing the address of the memory location where the code portion of the mini OS module is to be loaded, just as it is. The size of the code portion 107 of the mini OS module calculated in step ST311 is then written into the code size entry of the header 113 for storing the size of the code portion of the mini OS module. The relative address of the top of the code portion 107 relative to the origin of the mini OS module 7 is thus written into the relative code address entry of the header 113. The absolute address of the data area stored in the header 106 of the OS program file 105 is written into the data address entry of the header 113 for storing the address of the memory location where the data portion 109 of the mini OS module is to be loaded, just as it is. The size of the data portion 109 of the mini OS module calculated instep ST312 is then written into the data size entry of the header 113 for storing the size of the data portion of the mini OS module. The relative address of the top of the data portion 109 relative to the origin of the mini OS module is thus written into the relative data address entry of the header 113. No specific value is written into the header 113 as the address of the symbol information area 111. In this way, specific data are written into the header 113 and the mini OS module 7 is completed in step ST293.

Next, the OS dividing program 112, in step ST314, extracts the code portion 108 of the OS main body module from the OS program file 105 and then writes the extracted code into the OS main body module 8. The OS dividing program 112 can determine the location of the code portion 108 of the OS main body module by adding the relative address of the code area stored in the header 106, i.e. the address of the code portion 107 of the mini OS module, which is relative to the origin of the OS program file, and the size of the code portion 107 of the mini OS module calculated in step ST311. The size of the code portion 108 of the OS main body module can be calculated by subtracting the size of the code portion 107 of the mini OS module calculated in step ST311 from the size of the code area of the OS program file 105, which is stored in the header 106 of the OS program file.

Next, the OS dividing program 112, instep ST315, extracts the data portion 110 of the OS main body module from the OS program file 105 and then writes the extracted data into the OS main body module 8. The OS dividing program 112 can determine the location of the data portion 110 of the OS main body module by adding the relative address of the data area that is relative to the origin of the OS program file, which is stored in the header 106, i.e. the address specifying the location of the data portion 109 of the mini OS module within the OS program file, and the size of the data portion 109 of the mini OS module calculated in step ST312. The size of the data portion 110 of the OS main body module can be calculated by subtracting the size of the data portion 109 of the mini OS module calculated in step ST312 from the size of the data area of the OS program file 105, which is stored in the header 106 of the OS program file.

The OS dividing program 112 then, in step ST316, generates the header 114 for the OS main body module 8. The address of the top of the function included in the code portion 108 of the OS main body module and searched for in step ST311 is written into a code address entry of the header 114 for storing the address of the memory location where the code portion of the OS main body module is to be loaded, just as it is. The size of the code portion 108 of the OS main body module calculated in step ST314 is then written into a code size entry of the header 114 for storing the size of the code portion of the OS main body module. The relative address of the top of the code portion 108 relative to the origin of the OS main body module is thus written into a relative code address entry of the header 114. The address of the variable located at the top of the data portion 110 of the OS main body module and searched for in step ST312 is written into a data address entry of the header 114 for storing the address of the memory location where the data portion of the OS main body module is to be loaded, just as it is. The size of the data portion 110 of the OS main body module calculated in step ST315 is then written into a data size entry of the header 114 for storing the size of the data portion of the OS main body module. The relative address of the top of the data portion 110 relative to the origin of the OS main body module is thus written into a relative data address entry of the header 114. No specific value is written into the header 114 as the address of the symbol information area 111. In this way, specific data are written into the header 114 and the OS main body module 8 is completed in step ST316. After that, the mini OS module 7 can be then stored in a boot block of a boot device, whereas the OS main body module 8 can be stored in a file system of the boot device.

Figure 38:
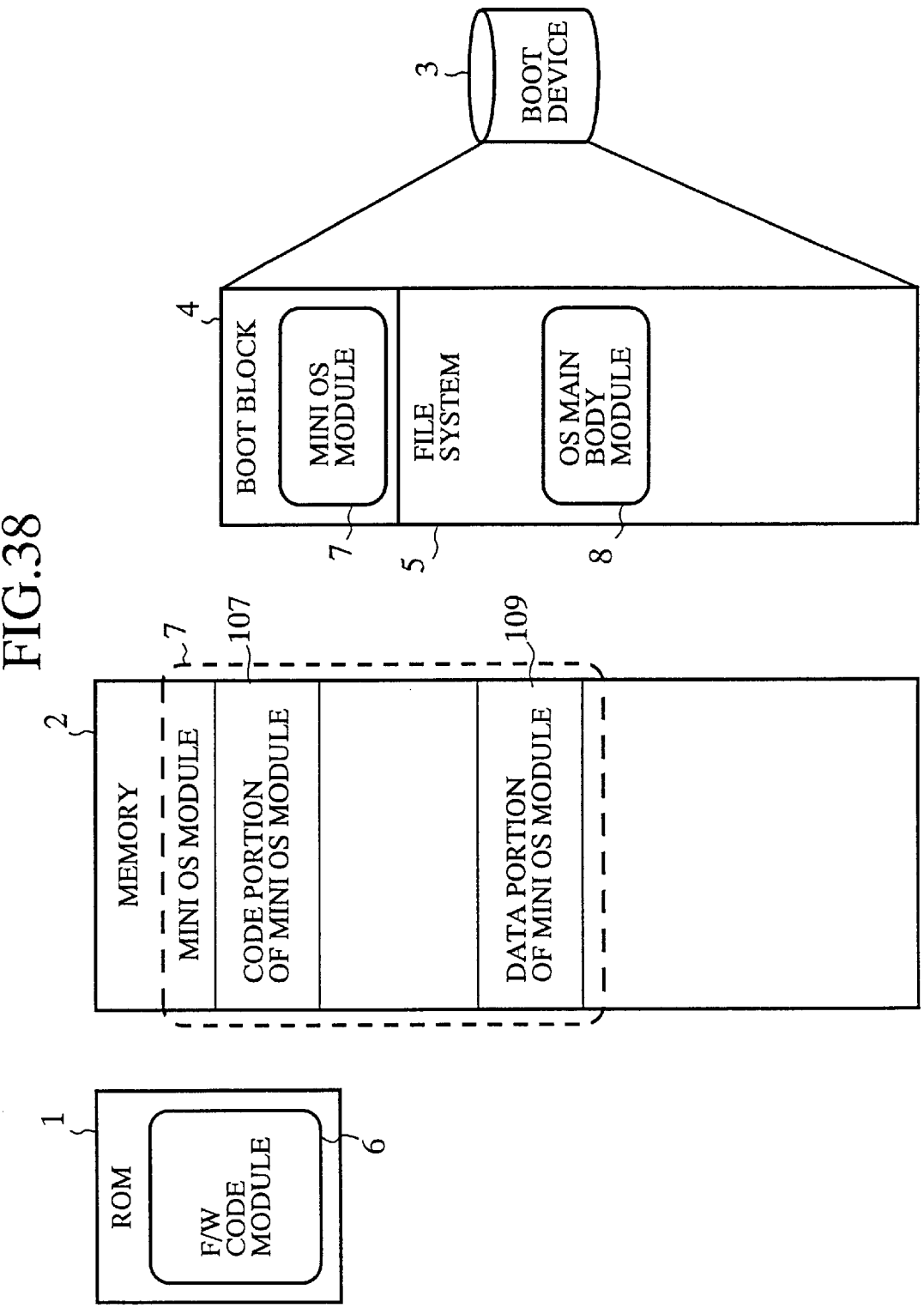
FIG. 38 is a block diagram showing a state in which the mini OS module is loaded into memory, of the information processing apparatus according to the eleventh embodiment of the present invention.

Referring next to FIG. 38, there is illustrated a block diagram showing a state in which the mini OS module is loaded into the memory, in the information processing apparatus according to the eleventh embodiment of the present invention. An F/W code module 6 can load the mini OS module 7 from the boot block 4 to the memory 2. The F/W code module 6 reads the relative address of the code portion 107 of the mini OS module, which is relative to the origin of the mini OS module, and the size of the code portion 107 from the header 113 of the mini OS module 7. The F/W code module 6 can then read the code portion 107 of the mini OS module out of the boot block 4, and load it into the memory 2 according to the absolute address stored in the header 113, specifying the location of the memory 2 where the code portion 107 is to be loaded. Similarly, the F/W code module 6 loads the data portion 109 of the mini OS module into the memory 2. The F/W code module 6 then transfers control to the code portion 107 of the mini OS module.

As shown in FIG. 38, there can be a free space between the code portion 107 and data portion 108 of the mini OS module, and another free space of several hundred kilobytes behind the data portion 109 of the mini OS module, those free spaces being intended for the OS main body module 8 to be loaded into. However, the mini OS module 7 does not need to be aware of the free spaces. This is because the mini OS module 7, which was extracted from the OS program file 105, will be able to run as the OS program file 105 including the OS main body module 8 and therefore does not need to perform a special operation on the free spaces.

Figure 39:
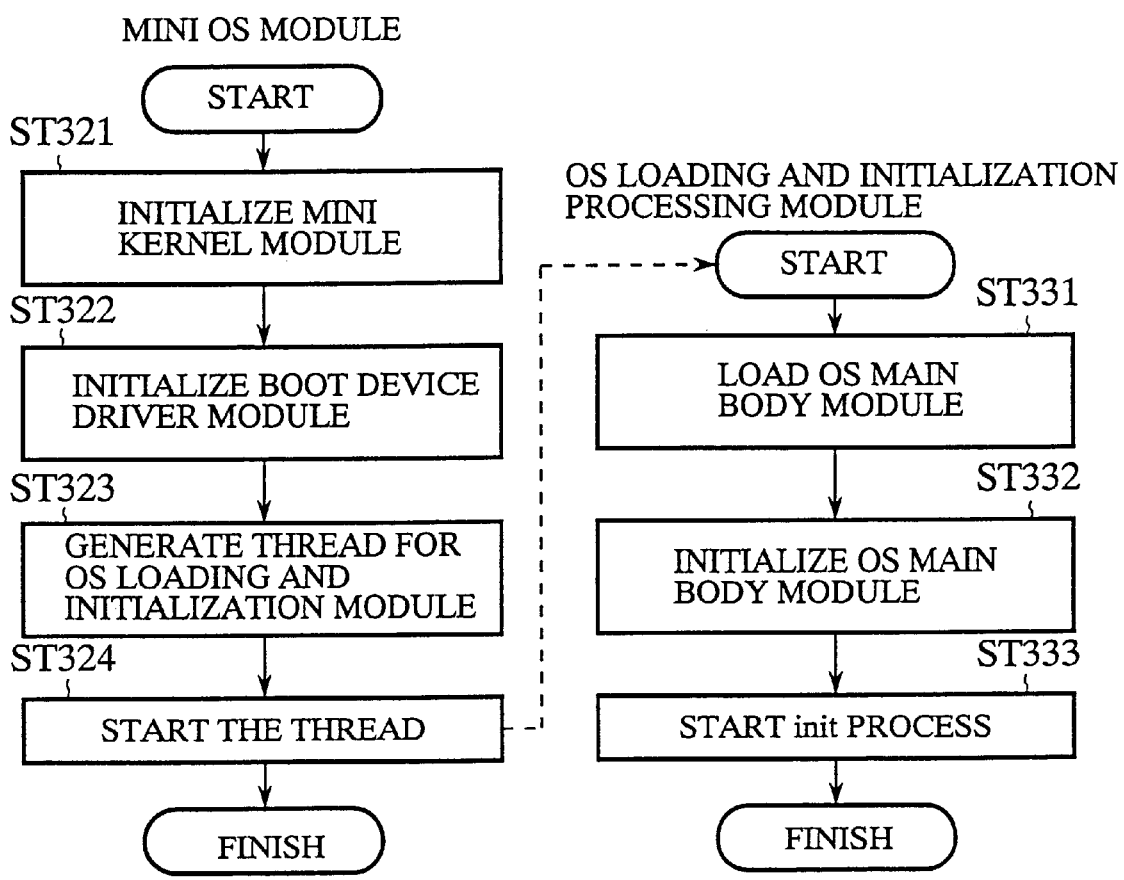
FIG. 39 is a flow chart showing operations of the mini OS module and an OS loading and initialization processing module of the information processing apparatus according to the eleventh embodiment of the present invention.

Referring next to FIG. 39, there is illustrated a flow chart showing operations of the mini OS module and an OS loading and initialization processing module of the information processing apparatus according to the eleventh embodiment of the present invention. When the mini OS module 7 receives control from the F/W code module, it then, in step ST321, executes initialization of a mini kernel module 9. Further, the mini OS module 7, in step ST322, executes initialization of a boot device driver module 10. The mini OS module 7, in step ST323, generates a thread for the OS loading and initialization processing module 11. The mini OS module 7 further, in step ST324, starts execution of the thread.

The OS loading and initialization processing module 11, in step ST331, loads the OS main body module 8 stored in the file system 5 of the boot device 3 into the memory 2. Before that, the OS loading and initialization processing module 11 reads the relative address of the code portion 108 of the OS main body module, which is relative to the origin of the OS main body module, and the size of the code portion 108 from the header 114 of the OS main body module 8. The OS loading and initialization processing module 11 then reads the code portion 108 of the OS main body module out of the file system 5, and loads it into the memory 2 according to the address specifying the location of the memory 2 where the code portion 108 is to be loaded. The OS loading and initialization processing module 11 then loads the data portion 110 of the OS main body module into the memory 2 in a similar way. Since the code and data portions 108 and 110 of the OS main body module were extracted from the OS program file 105, they are not overlaid on the code and data portions 107 and 109 of the mini OS module when they are loaded into the memory. Furthermore, since the mini OS module 7 and the OS main body module 8 were extracted from the OS program file 105 statistically combined, no not-yet-defined symbol or the like occurs. Therefore, there is no need to link the mini OS module 7 with the OS main body module 8.

Figure 40:
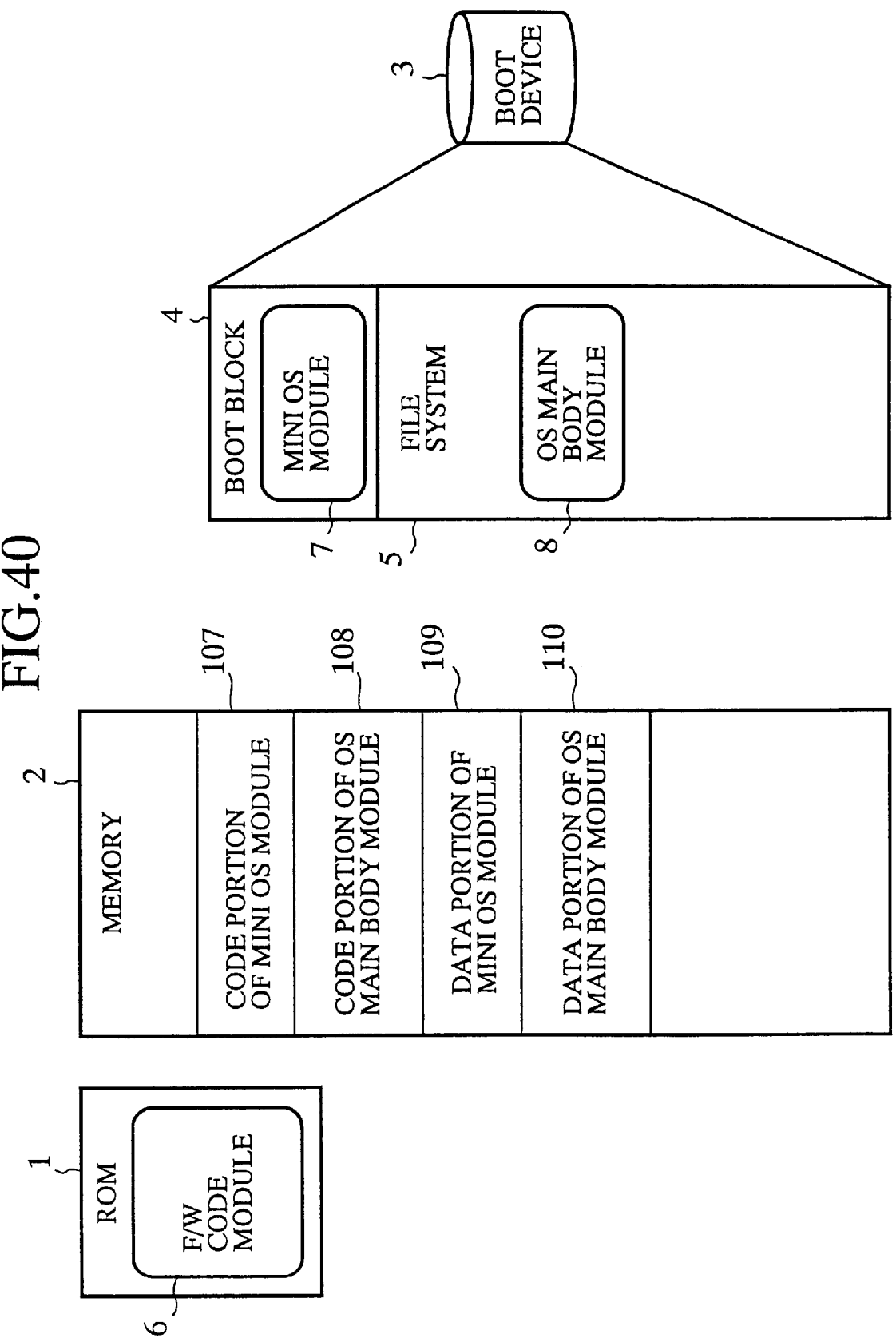
FIG. 40 is a block diagram showing a state in which the OS main body module is loaded into memory, of the information processing apparatus according to the eleventh embodiment of the present invention.

Referring next to FIG. 40, there is illustrated a diagram showing a state in which the OS main body module is loaded into the memory. The OS loading and initialization processing module 11 then, in step ST332, executes initialization of the OS main body module 8. After that, the OS loading and initialization processing module 11, in step ST333, loads the first process, called init, to be executed first after booting up the information processing apparatus from the file system 5 into the memory 2. The OS loading and initialization processing module 11 then starts execution of the first process. Thus, the initialization of the OS is completed.

As previously mentioned, in accordance with the eleventh embodiment of the present invention, after the translation into object language of the mini OS module source and the translation of object language of the OS main body module source are statistically combined into the OS program file 105, the OS program file 105 is divided into the mini OS module 7 which is located in the boot block 4 and the OS main body module 8 which is located in the file system 5, by means of the OS dividing program. Accordingly, the eleventh embodiment of the present invention offers the advantage of being able to eliminate the need for linking the OS main body module 8 with the mini OS module 7 when loading the OS main body module 8 into the memory, and therefore to reduce the time required for booting up the information processing apparatus.

Many widely different embodiments of the present invention may be constructed without departing from the spirit and scope of the present invention. It should be understood that the present invention is not limited to the specific embodiments described in the specification, except as defined in the appended claims.

What is claimed is:

1. An information processing apparatus comprising:
   a boot device divided into a boot block in which a mini operating system (OS) module having a function of bootstrap is located and a file system in which an operating system (OS) main body module having functions other than said function of bootstrap; and
   a read-only memory or ROM in which a firmware or F/W code module is located for loading said mini OS module located in said boot block into a memory and for starting execution of said mini OS module instead of a bootstrap code when booting up said information processing apparatus, said mini OS module loading said OS main body module from said file system of said boot device into said memory, and said mini OS module being linked to said OS main body module.

2. A method of booting up an information processing apparatus comprising a boot device and a memory by loading an operating system into the memory, comprising the steps of:
   dividing the operating system into a mini operating system (OS) module having a function of bootstrap and an operating system (OS) main body module having functions other than said function of bootstrap, said mini OS module including a mini kernel module that is a basic part of the operating system, a boot device driver module for performing input/output (I/O) operations on said boot device, and an OS loading and initialization processing module for loading said OS main body module into said memory and for initializing said OS main body module;
   locating said mini OS module in a boot block of said boot device;
   locating said OS main body module in a file system of said boot device;
   a firmware or F/W code module being stored in a ROM and loading said mini OS module located in said boot block into said memory when booting up said information processing apparatus;
   said mini OS module initializing said mini kernel module and said boot device driver module;

said mini OS module generating and starting execution of a thread for said OS loading and initialization processing module; and said OS loading and initialization processing module loading said OS main body module stored in said file system into said memory and then initializing said OS main body module.

3. The method according to claim 2, wherein said OS main body module is divided into a plurality of functional modules including a device driver module, which are located as separate files in said file system, and said OS loading and initialization processing module is divided into an OS loading processing module for loading each of said plurality of functional modules into said memory and an OS initialization module for initializing each of said plurality of functional modules loaded into said memory by said OS loading processing module, and wherein after said mini OS module is loaded into said memory, said mini OS module initializes said mini kernel module and said boot device driver module and then generates and starts execution of a thread for said OS loading processing module, after the thread for said OS loading processing module is started, said OS loading processing module loads each of said plurality of functional modules into said memory and then generates and starts execution of a thread for said OS initialization module every time it loads each of said plurality of functional modules, and, after the thread for said OS initialization module is started, said OS initialization module initializes each of said plurality of functional modules loaded into said memory.

4. The method according to claim 3, wherein said plurality of functional modules, into which said OS main body module is divided, are stored as compressed files in said file system and said loading and initialization processing module of said mini OS module is divided into an OS loading and decompression processing module and an OS initialization module, and wherein said mini OS module generates and starts execution of a thread for said OS loading and decompression processing module after said mini OS module initializes said mini kernel module and said boot device driver module, after the thread for said OS loading and decompression processing module is started, said OS loading and decompression processing module loads each of said plurality of functional modules into said memory and decompresses the loaded functional module, and then generates and starts execution of a thread for said OS initialization module, and after the thread for said OS initialization module is executed, said OS initialization module initializes each of said plurality of functional modules loaded into said memory and decompressed.

5. The method according to claim 4, wherein said OS loading and decompression processing module is divided into an OS loading processing module and an OS decompression processing module, and wherein said mini OS module generates and starts execution of a thread for said OS loading processing module after said mini OS module initializes said mini kernel module and said boot device driver module, after the thread for said OS loading processing module is started, said OS loading processing module loads each of said plurality of compressed functional modules into said memory, and then generates and starts execution of a thread for said OS decompression processing module, after the thread for said OS decompression processing module is started, said OS decompression processing module decompresses each of the plurality of compressed functional module loaded into said memory and then generates and starts execution of a thread for said OS initialization module, and, after the thread for said OS initialization module is started, said OS initialization module initializes each of said functional modules loaded into said memory and decompressed by said OS decompression processing module.

6. The method according to claim 3, wherein said OS loading processing module of said mini OS module is an application (AP) execution and OS loading processing module for starting execution of at least a predetermined application module which is located in said file system and which can automatically be started and run on the operating system when booting up said information processing apparatus, and for loading each of said plurality of functional modules into said memory, and said predetermined application module includes a function definition file in which some functional modules required for said application module to run on said operating system are listed, and wherein after said mini OS module is loaded into said memory, said mini OS module initializes said mini kernel module and said boot device driver module and then generates and starts execution of a thread for said AP execution and OS loading processing module, after the thread for said AP execution and OS loading processing module is started, said AP execution and OS loading processing module loads said application module from said file system into said memory and further loads some functional modules required for said application module into said memory according to said function definition file included in said application module, and then generates and starts execution of a thread for said OS initialization module, after the thread for said OS initialization module is started, said OS initialization module then initializes each of said some functional modules loaded into said memory, and, after the initialization of all of said some functional modules is completed, said application execution and OS loading processing module further loads the remainder of all functional modules included in said OS main body module into said memory and initializes the remainder using said OS initialization processing module while starting execution of said application module as a process.

7. The method according to claim 2, wherein said mini OS module includes a thread synchronization module for providing synchronization between a thread for said OS loading processing module and a thread for said OS initialization module using said mini kernel module, and wherein said mini OS module generates and starts execution of a thread for said OS loading processing module and a thread for said OS initialization module after said mini OS module initializes said mini kernel module and said boot device driver module, after those threads are started, said OS initialization module brings itself into a state in which it is waiting for a request for initialization of a functional module through said thread synchronization module, every time said OS loading processing module loads each of said plurality of functional modules into said memory, said OS loading processing module makes a request of said OS initialization module for initialization of each of said plurality of functional modules through said thread synchronization module, and said OS initialization module initializes each of said plurality of functional modules loaded into said memory every time said OS initialization module receives a request for initialization of each of said plurality of functional modules loaded into said memory from said OS loading processing module, and then waits for another request for initialization.

8. The method according to claim 2, wherein said OS loading and initialization processing module of said mini OS module is divided into an OS loading processing module and an OS initialization module, said OS main body module is divided into a plurality of blocks of arbitrary record size, each of which includes a loading flag consisting of a plurality of bits respectively corresponding to said plurality of functional modules included in said OS main body module, and, said loading flag of one of said plurality of blocks including the end of any one of said plurality of functional modules has a corresponding bit set to a predetermined value, and wherein after said mini OS module is loaded into said memory, said mini OS module initializes said mini kernel module and said boot device driver module and then generates and starts execution of a thread for said OS loading processing module, after the thread for said OS loading processing module is started, said loading processing module loads each of said plurality of blocks of said OS main, body module into said memory, and refers to said loading flag every time it loads each of said plurality of blocks into said memory, only if a bit of said loading flag is set to a predetermined value, said OS loading processing module generates and starts execution of a thread for said OS initialization module, and, after the thread for said OS initialization module is started, said OS initialization module initializes a corresponding one of said plurality of functional modules loaded into said memory.

9. The method according to claim 2, wherein said OS loading and initialization processing module is divided into an OS loading processing module and an OS initialization module, said OS main body module is divided into a plurality of blocks of arbitrary record size, each of which includes a loading flag, and said loading flag of one of said plurality of blocks including the end of any one of said plurality of functional modules has the address of a linkage processing function of linking said one functional module with said mini OS module and the address of an initialization processing function of initializing said one functional module, and wherein after said mini OS module is loaded into said memory, said mini OS module initializes said mini kernel module and said boot device driver module and then generates and starts execution of a thread for said OS loading processing module, after the thread for said OS loading processing module is started, said loading processing module loads each of said plurality of blocks of said OS main body module into said memory, and refers to said loading flag every time it loads each of said plurality of blocks into said memory, only if said loading flag has a value other than zero, said OS loading processing module generates and starts execution of a thread for said OS initialization module, and, after the thread for said OS initialization module is started, said OS initialization module calls a linkage processing function and an initialization processing function according to the value of said loading flag.

10. The method according to claim 2, further comprising the steps of, in order to generate said mini OS module and said OS main body module, combining an object file of said mini OS module and an object file of said OS main body module into an operating system file by using a linkage editor or linker, and dividing said operating system file into said mini OS module and said OS main body module according to link information.

11. A method of booting-up an information processing apparatus comprising a boot device and a memory by loading an operating system into the memory, comprising the steps of:

dividing the operating system into a mini operating system (OS) module having a function of bootstrap and operating system (OS)main body module having functions other than said function of bootstrap, said mini OS module including a mini kernel module that is a basic part of the operating system, a boot device driver module for performing input/output (I/O) operations on said boot device, and an OS loading and initialization processing module for loading said OS main body module into said memory and for initializing said OS main body module;

locating said mini OS module in a read-only memory or ROM;

locating said OS main body module in a file system of said boot device;

a firmware or F/W code module being stored in said ROM and directly executing said mini OS module located in said ROM when booting tip said information processing apparatus;

said mini OS module loading only data portions of said mini kernel module, said boot device driver module, and said OS loading and initialization processing module into said memory;

said mini OS module initializing said mini kernel module and said boot device driver module;

said mini OS module generating and starting execution of a thread for said OS loading and initialization processing module; and said OS loading and initialization processing module loading said OS main body module stored in said file system into said memory and then initializing said OS main body module.

12. The method according to claim 11, wherein said mini OS module further includes an address resolve table used for linking said mini OS module with said OS main body module, and wherein after said mini OS module generates and starts execution of a thread for said OS loading-and initialization processing module, said OS loading and initialization processing module loads said OS main body module into said memory and then initializes it, loads a first process to be executed first, into said memory, loads code portions of said mini kernel module and said boot device driver module into said memory, and writes addresses of said code portions loaded into said memory into said address resolve table.

* * * * *